United States Patent
Sakuyama et al.

(10) Patent No.: US 6,226,011 B1
(45) Date of Patent: May 1, 2001

(54) COLOR CONVERSION METHOD FOR A COLOR MATCHING, A METHOD FOR EXPANDING A FUNCTION OF A PROGRAM MODULE AND A COLOR CONVERSION METHOD USING THE METHOD FOR EXPANDING A FUNCTION OF A PROGRAM MODULE

(75) Inventors: Hiroyuki Sakuyama, Tokyo; Hisao Shirasawa, Kanagawa; Mitsuhisa Kanaya; Takanori Yano, both of Tokyo, all of (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/050,908

(22) Filed: Mar. 31, 1998

(30) Foreign Application Priority Data

Apr. 1, 1997 (JP) .................................... 9-083172

(51) Int. Cl.$^7$ .................................... G06T 11/40
(52) U.S. Cl. .................... 345/431; 345/430; 345/432; 345/426
(58) Field of Search .................... 345/431, 430, 345/432, 426, 153; 358/518, 521

(56) References Cited

U.S. PATENT DOCUMENTS

| | | | | |
|---|---|---|---|---|
| 4,941,038 | * | 7/1990 | Waloait | 358/80 |
| 5,257,097 | * | 10/1993 | Pineau et al. | 358/500 |
| 5,377,025 | * | 12/1994 | Spaulding et al. | 358/518 |
| 5,416,890 | * | 5/1995 | Beretta | 395/131 |
| 5,465,104 | * | 11/1995 | Munson | 345/150 |
| 5,600,764 | * | 2/1997 | Kakutani | 395/131 |
| 5,704,021 | | 12/1997 | Smith et al. . | |
| 5,977,946 | * | 11/1999 | Mizobata | 345/112 |

FOREIGN PATENT DOCUMENTS

| | | |
|---|---|---|
| 7-107312 | 4/1995 | (JP) . |
| 7-236066 | 9/1995 | (JP) . |
| 7-236067 | 9/1995 | (JP) . |

* cited by examiner

Primary Examiner—Mark Zimmerman
Assistant Examiner—Mano Padmanabhan
(74) Attorney, Agent, or Firm—Oblon, Spivak, McClelland, Maier & Neustadt, P.C.

(57) ABSTRACT

A color matching process which can respond to a type of object to be processed is automatically performed by a printer driver. The color conversion method converts first color image information into second color image information output to a color image outputting apparatus. It is determined whether or not the first color image information includes an instruction for designating a color matching method. A type of each object included in the first color image information is discriminated when the first color image information does not include the instruction for designating a color matching method. One of a plurality of color matching methods suitable for the type of each object is selected in accordance with previously prepared correspondence information between each type of object and each color matching method. A color matching process is performed on each object in the first color image information by using the selected color matching method so as to convert the first color image information into the second color image information.

10 Claims, 30 Drawing Sheets

FIG.26

- INITIALIZATION PROCESS
- END PROSSESS

- OBTAIN PRINTER INFORMATION,DRIVER INFORMATION
- OBTAIN FONT INFORMATION,CHARACTER INFORMATION
- OBTAIN COLOR INFORMATION
- OBTAIN INFORMATION OF OBJECT TO BE DRAWN

- PRODUCE PHYSICAL COLOR
- PRODUCE PHYSICAL OBJECT TO BE DRAWN

- DRAW BIT MAP
- DRAW TEXT
- DRAW GRAPHICS

USE EXPANDED FUNCTION OF PRINTER

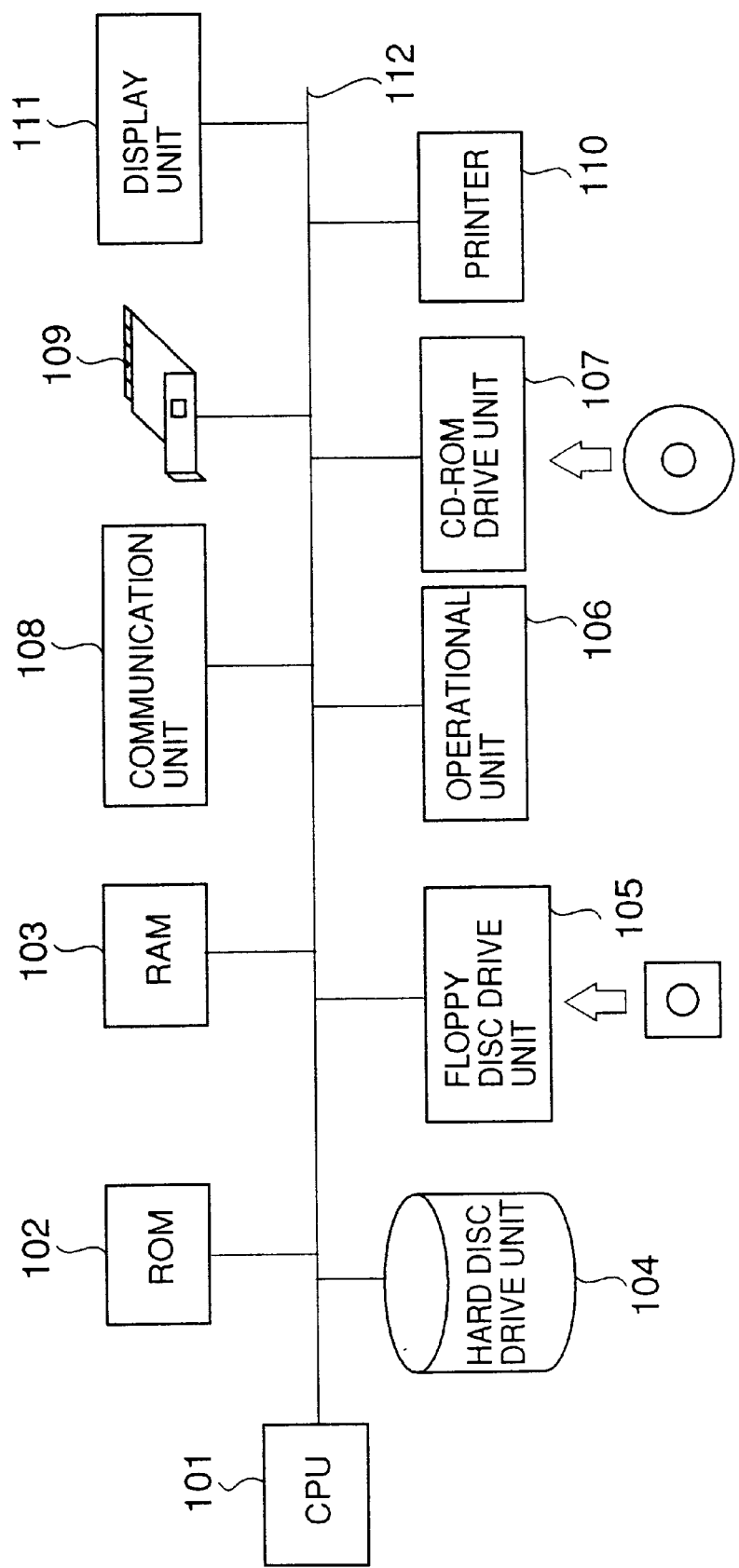

COLOR CONVERSION METHOD FOR A COLOR MATCHING, A METHOD FOR EXPANDING A FUNCTION OF A PROGRAM MODULE AND A COLOR CONVERSION METHOD USING THE METHOD FOR EXPANDING A FUNCTION OF A PROGRAM MODULE

BACKGROUND OF THE INVENTION

1. Field of the Invention

The present invention generally relates to a color conversion processing method for a color image output apparatus and, more particularly, to a color conversion processing method which enables a color matching process to deal with a plurality of types of drawing objects supplied to a color image output apparatus. The present invention also relates to a method for expanding a program module which can be dynamically linked with other programs, and a color conversion processing method using such a method for expanding a program module. The present invention further relates to a processor readable medium which stores a program causing a computer to perform such a color conversion processing method.

2. Description of the Related Art

A color matching system using device independent colors is studied so as to provide color image data to a color printer, the color image data accurately representing a color image displayed on a color display monitor. The purpose of provision of such a color matching system is to obtain the same color image from different devices. Generally, a signal matching a visual sense of a human being such as the CIE 1931 XYZ signal or the L*a*b* signal is used as a color signal which is independent for each device.

However, a color representation which is preferable to a human being differs for different types of images such as a natural color image (photographic image), a character image or an illustration image. Accordingly, in order to obtain color image information which includes various types of images, an architecture which can switch a color processing according to a document structure included in a color image is required.

Japanese Laid-Open Patent Application No. 7-107312 discloses a color information processing method and apparatus which is related to a technique for changing a color processing in accordance with a document structure included in the color image. In the method and apparatus of this patent document, attribute information of a color matching which is appropriate for one of various types of images is set by application software, and a device driver or a color matching processing unit in a printer performs a suitable color matching process in accordance with the attribute information.

However, in the color image outputting system disclosed in the above-mentioned patent document, the attribute information of a color matching for each type of image is set on the application software side. Thus, there is a problem in that only a single color matching process can be applied when the application software is not provided with a function to add the attribute information of a color matching process. Specifically, if the application software is not provided with the above-mentioned function, the Windows 95, for example, can apply only a single color matching process.

Additionally, there is a problem in that a result of output differs for each application software even for the same color image since how to the attribute information is set is also dependent on the application software.

Additionally, at the present time, most applications are not provided with the function to add the attribute information of a color matching process for each type of image. Thus, there is a problem in that it is practically impossible to change the method of color matching for each type of image.

SUMMARY OF THE INVENTION

It is a general object of the present invention to provide an improved and useful color conversion method and apparatus in which the above-mentioned problems are eliminated.

A more specific object of the present invention is to provide a technique for automatically performing a color matching process which can respond to a type of object to be processed on the printer driver side.

In order to achieve the above-mentioned objects, there is provided according to one aspect of the present invention a color conversion method for converting first color image information into second color image information output to a color image outputting apparatus, the color conversion method comprising the steps of:

inputting the first color image information including at least one object to be drawn;

determining whether or not the first color image information includes an instruction for designating a color matching method;

discriminating a type of each object included in the first color image information when the first color image information does not include the instruction for designating a color matching method;

selecting one of a plurality of color matching methods suitable for the type of each object in accordance with previously prepared correspondence information between each type of object and each color matching method; and performing a color matching process on each object in the first color image information by using the color matching method selected in the selecting step so as to convert the first color image information into the second color image information.

According to the above-mentioned invention, an appropriate color matching process can be performed for each object even if a color matching method is not designated in color image information, and a high-quality color image can be output from the color image outputting apparatus such as a color printer.

Additionally, there is provided according another aspect of the present invention a color conversion method for converting first color image information into second color image information output to a color image outputting apparatus, the color conversion method comprising the steps of:

inputting the first color image information including at least one object to be drawn;

determining whether or not the first color image information includes attribute information of a color matching process for each object in the first color image information;

discriminating a type of each object included in the first color image information when the first color image information does not include the attribute information of a color matching process to be applied to each object in the first color image information;

selecting one of a plurality of color matching methods suitable for the type of each object in accordance with previously prepared correspondence information between each type of object and each color matching method;

adding attribute information of the selected color matching method to the corresponding object; and performing a color matching process on each object in the first color image information by using the color matching method selected in the selecting step so as to convert the first color image information into the second color image information.

According to this invention, a color matching process can be performed for each object even if attribute information of the color matching method is not designated for each object in a color matching control system by using the attribute information of each object.

In the color conversion method according to the present invention, the selecting step may include the steps of:

determining whether or not a first drawing command attached to the first color image information is based on an original color signal peculiar to the color image outputting apparatus; and restructuring the first drawing command by setting a color space, when the first drawing command is not based on the original color signal, so that the first drawing command can be converted into a second drawing command which is based on the original color signal, wherein the performing step includes the step of outputting the second drawing command to the color image outputting apparatus.

According to this invention, a color matching can be performed even if a color matching is turned off in a color matching control system using a drawing command.

Additionally, in the color conversion method according to the present invention, the discriminating step may include the step of determining whether or not each object in the first color image information corresponds to a bit map image, and the selecting step may include the step of providing an instruction for using a gradation maintaining type color matching method in the second drawing command for each object corresponding to the bit map image. Accordingly, an appropriate color matching process can be performed in response to the type of each object.

Further, the discriminating step may include the step of determining whether or not each object in the first color image information corresponds to a bit map image, and the restructuring step may be performed only for the object corresponding to the bit map image. Accordingly, an appropriate color matching process can be performed in response to the type of each object.

Additionally, the discriminating step may include the step of determining whether or not each object in the first color image information corresponds to a single color image, and the selecting step may include the step of providing an instruction for using a chroma maintaining type color matching method in the second drawing command for each object corresponding to the single color image. Accordingly, an appropriate color matching process can be performed in response to the type of each object.

Additionally, the discriminating step may include the step of determining whether or not each object in the first color image information corresponds to a pattern image using a plurality of colors, and the selecting step may include the step of providing an instruction for using an intermediate method between a gradation maintaining type color matching method and a chroma maintaining type color matching method in the second drawing command for each object corresponding to the pattern image using a plurality of colors.

Additionally, there is provided according to another aspect of the present invention a processor readable medium which stores program code causing a compute to perform the above-mentioned color conversion methods according to the present invention.

Further, there is provided according to another aspect of the present invention a method for expanding a function of a dynamic linking program module adapted to be dynamically linked to an upper order module including an operating system or an application program, the dynamic linking program module inputting a first command from the upper order module so as to perform a process instructed by the first command, the method comprising the steps of:

generating a second command by changing an argument included in the first command based on a previously prepared condition, the second command being output to the dynamic linking program module;

obtaining a result of a process instructed by the second command from the dynamic linking program module; and outputting a result of the process instructed by the first command to be output from the dynamic linking program module to the upper order module based on the result of the process instructed by the second command.

According to this invention, a function of a program module can be expanded or changed in a simple manner even if the program module is a conventional one and a source program thereof is not available.

Additionally, there is provided according to another aspect of the present invention a method for expanding a function of a dynamic linking program module adapted to be dynamically linked with an upper order module including an operating system or an application program, the dynamic linking program module receiving a command designating first command execution information so as to perform a process instructed by the command which is output from the upper order module, the method comprising the steps of:

preparing second command execution information having a designation the same as first command execution information designated by the command output from the upper order module, contents of the second command execution information being different from contents of the first command execution information;

performing the process instructed by the command output from the upper order module, when the command instructs execution of the process in accordance with the first command execution information, in accordance with the second command execution information instead of the first command execution information; and outputting a result of the process to the upper order module as a response to the command output from the upper order module.

According to this invention, a function of a program module can be expanded or changed in a simple manner even if the program module is a conventional one and a source program thereof is not available.

Additionally, there is provided according to another aspect of the present invention a method for expanding a function of a dynamic linking program module adapted to be dynamically linked with an upper order module including an operating system or an application program, the dynamic linking program module receiving a command output from the upper order module so as to perform a process instructed by the command, the method comprising the steps of:

preparing command execution information which is not included in the dynamic linking program module, the command execution information being designated by the upper order module;

sending to the dynamic linking program module a command for instructing execution of a process in accordance with the command execution information when the command requesting the process in accordance with the command execution information is output from the upper order module;

performing the process instructed by the command output from the upper order module in accordance with the command execution information when the command instructs execution of the process in accordance with the command execution information; and outputting a result of the process to the upper order module as a response to the command output from the upper order module.

According to this invention, a function of a program module can be expanded or changed in a simple manner having a greater freedom even if the program module is a conventional one and a source program thereof is not available.

Additionally, there is provided according to another aspect of the present invention a processor readable medium which stores program code causing a computer to perform the above-mentioned methods for expanding a dynamic linking program module.

Further, there is provided according to another aspect of the present invention a color conversion processing method using a method for expanding a function of a dynamic linking program module adapted to be dynamically linked to an upper order module including an operating system or an application program, the dynamic linking program module inputting a first command from the upper order module so as to perform a process instructed by the first command, wherein the upper order module corresponds to drawing control means for controlling a drawing process performed by a color image output apparatus, the first command includes a first drawing command and the dynamic linking program module corresponds to color conversion means for converting the first drawing command into a second drawing command peculiar to the color image outputting apparatus when the first drawing command and drawing color information are input from the drawing control means, the first drawing command being attached with attribute information of a predetermined color matching method, the drawing color information indicating a color of an object, the color conversion means applying a color matching process in accordance with the attribute information to the drawing color information and outputting the second drawing command and the drawing color information subjected to the color matching process to the color image outputting apparatus, wherein the color conversion processing method comprises the steps of:

discriminating a type of an object to be drawn based on the first drawing command input from the drawing control means;

selecting attribute information from among sets of attribution information of different color matching methods prepared for each type of object;

replacing the attribute information attached to the first drawing command with the selected attribute information so as to convert the first drawing command into the second drawing command;

outputting the second drawing command and the drawing color information to the color conversion means; and applying a color matching process to the drawing color information by the color conversion means based on the selected attribute information.

According to this invention, an appropriate color matching process can be performed in response to a type of object by using a color conversion means (a printer driver) which is capable of handling a color matching but is not capable of discriminating a type of object.

Additionally, there is provided according to another aspect of the present invention a color conversion processing method using a method for expanding a function of a dynamic linking program module adapted to be dynamically linked to an upper order module including an operating system or an application program, the dynamic linking program module inputting a first command from the upper order module so as to perform a process instructed by the first command, wherein the upper order module corresponds to drawing control means for controlling a drawing process performed by a color image outputting apparatus, the first command includes a first drawing command and the dynamic linking program module corresponds to drawing command conversion means, which is not capable of applying a color matching process, for converting the first drawing command into a second drawing command peculiar to the color image outputting apparatus when the first drawing command and drawing color information are input from the drawing control means, the drawing color information indicating a color of the object, the drawing command conversion means outputting the second drawing command and the drawing color information to the color image outputting apparatus, wherein the color conversion processing method comprises the steps of:

discriminating a type of an object to be drawn based on the first drawing command input from the drawing control means;

selecting attribute information from among sets of attribute information of different color matching methods prepared for each type of object based on a result of determination of the discriminating step;

applying a color matching process to the drawing color information based on the selected attribute information;

outputting the first drawing command and the drawing color information to the drawing command conversion means based on the first drawing command; and converting by the drawing command conversion means the first drawing command into the second drawing command peculiar to the color image outputting apparatus by using the first drawing command and the drawing color information output by the outputting step; and outputting the second drawing command and the drawing color information to the color image outputting apparatus.

According to this invention, an appropriate color matching process can be performed in response to a type of object by using a drawing command conversion means (a printer driver) which is not capable of handling a color matching.

Additionally, the color conversion processing method according to the present invention may further comprises the step of producing and maintaining a plurality of sets of attribute information corresponding to the type of the object. Accordingly, an appropriate color matching process can be performed in response to a type of object.

Further, the object may be classified in one of three types comprising a bit map image, a character image and a graphic image.

Additionally, the discriminating step may include the step of preventing application of the color matching process to the drawing color information when the object to be drawn is determined to be the character image. Accordingly, a color matching process can be performed which satisfies requirements by a user who attaches a great importance to the intensity or brightness for a character image rather than a color matching.

Further, the discriminating step may further include the steps of:

determining whether the character image is in one of colors consisting of cyan, magenta, yellow, black, red, green, blue and white when the object to be drawn corresponds to the character image; and preventing application of the color matching process to the object to be drawn when the object is in one of the colors.

According to this invention, an appropriate color matching process can be performed for each object while preventing a noncontinuity in colors and suppressing an error in the color matching.

Additionally, there is provided according to another aspect of the present invention a processor readable medium which stores program code causing a computer to perform the above-mentioned color conversion processing method and the method for expanding a function of a dynamic linking program module according to the present invention.

Other objects, features and advantages of the present invention will become more apparent from the following detailed description when read in conjunction with the accompanying drawings.

BRIEF DESCRIPTION OF THE DRAWINGS

FIG. 26 is an illustration for explaining DDI functions;

FIG. 32 is a system structure diagram of hardware of the color conversion processing system according to the first to fifth embodiments of the present invention.

DETAILED DESCRIPTION OF THE PREFERRED EMBODIMENTS

First Embodiment

Figure 1:
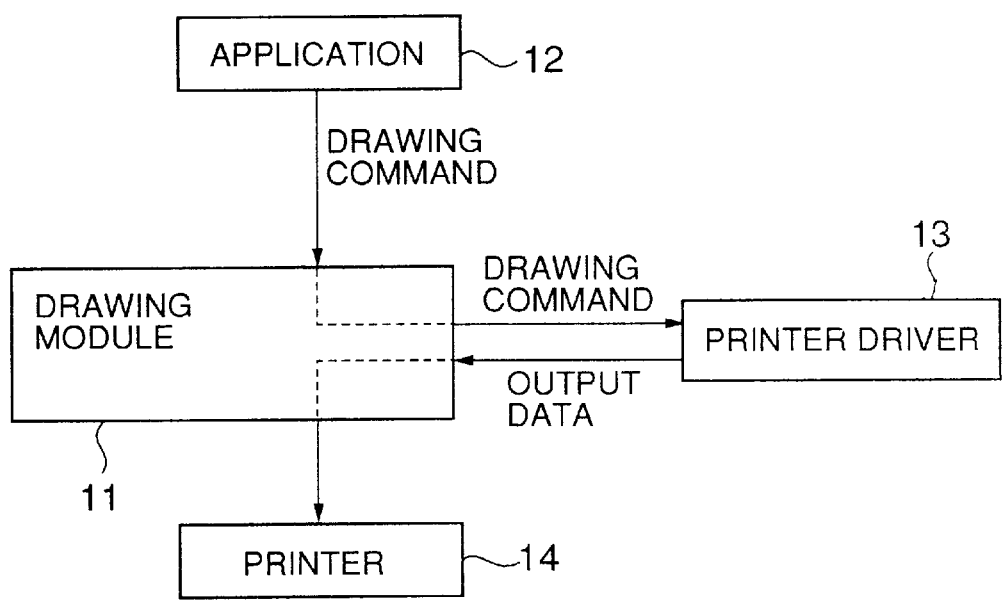
FIG. 1 is a block diagram of a color conversion processing system according to a first embodiment of the present invention.

A method and apparatus for a color conversion process according to a first embodiment of the present invention relates to a system for controlling an on/off operation of a color matching process performed by an application using a drawing command. According to the first embodiment, when the color matching process is turned off, the drawing command can be rewritten to be one similar to that obtained when the color matching process is turned on. It should be noted that the first embodiment is described with reference to a case in which a color image displayed on a monitor is output to a printer.

FIG. 1 is a block diagram of a color conversion processing system according to the first embodiment of the present invention. The color conversion processing system shown in FIG. 1 comprises a drawing module 11 and a printer driver 13. The drawing module 11 inputs a drawing command from an application 12. The printer driver 13 inputs the drawing command from the drawing module 11 and applies a color matching process to the drawing command so as to convert the drawing command into data to be output to a printer 14.

Figure 2:
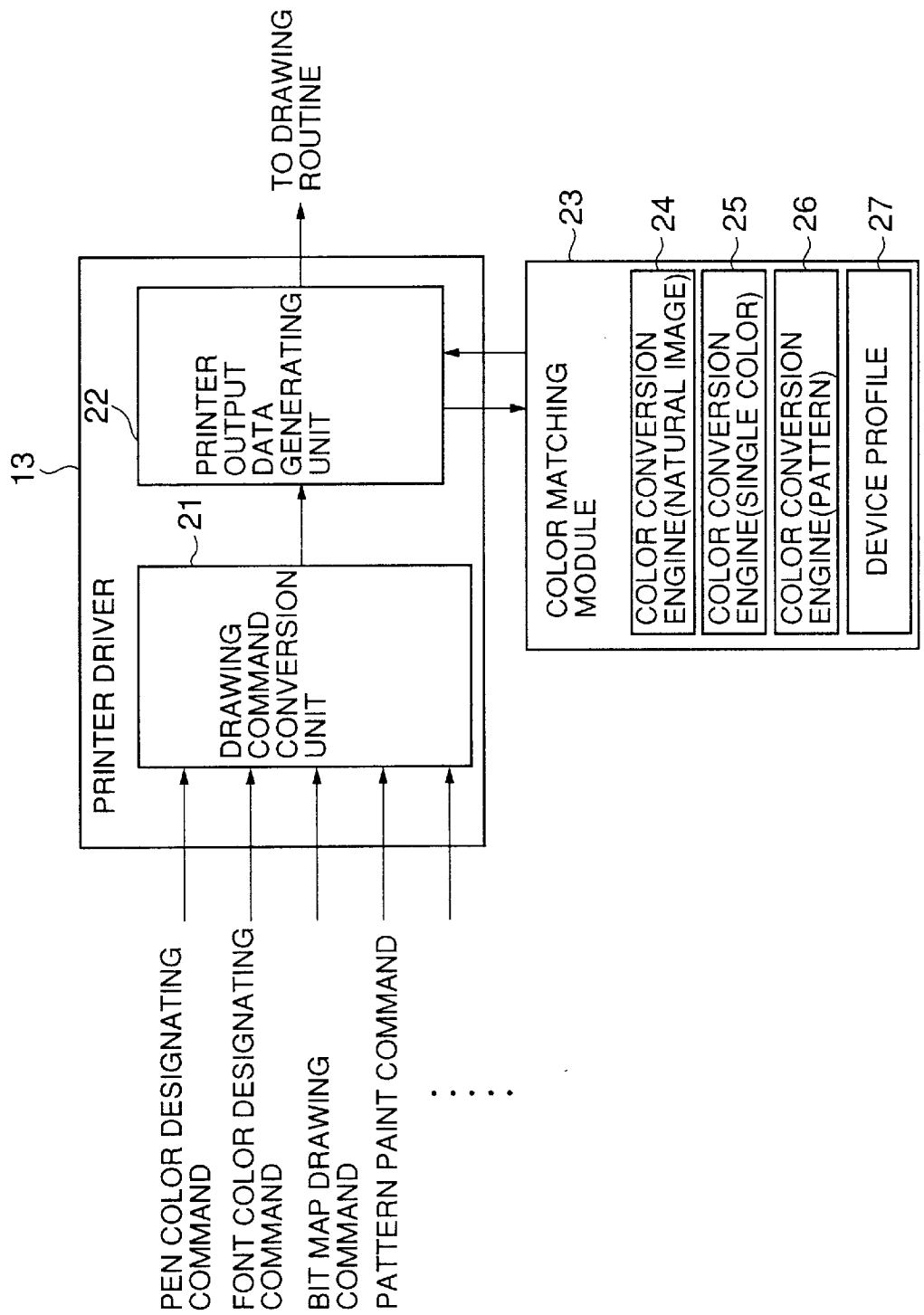
FIG. 2 is a block diagram of a printer driver shown in FIG. 1.

FIG. 2 is a block diagram of the printer driver 13 shown in FIG. 1. The printer driver 13 is activated as an interruption processing module when the color matching process is turned off. The printer driver 13 inputs the drawing command output from the drawing module 11. The printer driver 13 comprises a drawing command conversion unit 21 and a printer output data generating unit 22. The drawing command conversion unit 21 sets a color space for a color matching so as to restructure the drawing command to be one which is similar to that obtained when the color matching process is turned on. The printer output data generating unit 22 inputs the drawing command restructured by the drawing command conversion unit 21 and applies the color matching process to the drawing command so as to convert the drawing command into output data which is output to a color image output apparatus such as the printer 14.

The drawing command conversion unit 21 sets the color space for the color matching by performing an interruption process so that the drawing command is restructured to be one which is obtained when the color matching is turned on. Additionally, the drawing command conversion unit 21 discriminates the type of object to be drawn so as to select a color matching method corresponding to the discriminated type of the object. Then, the drawing command conversion unit 21 sets parameters of the color matching method in the drawing command when the drawing command is restructured.

Figure 3:
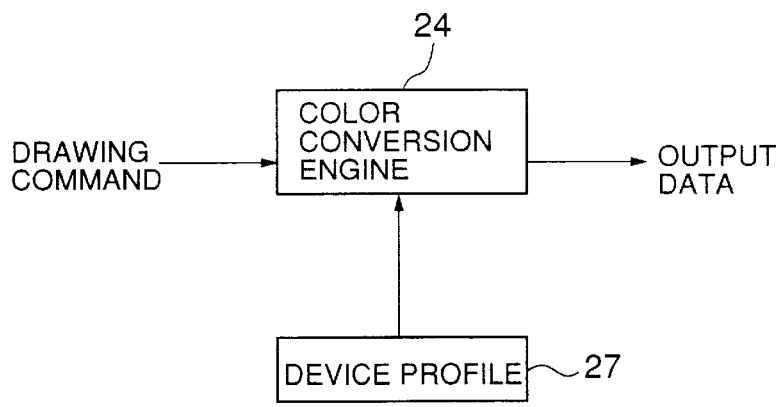
FIG. 3 is an illustration for explaining an operation of a color conversion engine.

The printer output data generating unit 22 is provided with a color matching module 23. The color matching module 23 includes a device profile 27 and a plurality of color conversion engines 24, 25 and 26. The device profile 27 stores a characteristic of each device. The color conversion engines 24 to 26 perform the color matching process by using the device profile 27. The printer output data generating unit 22 activates one of the color conversion engines 24 to 26, for example, the color conversion engine 24, based on the parameters of the color matching method set in the drawing command restructured by the drawing command conversion unit 21, as shown in FIG. 3, so as to perform the color matching process by using the device profile 27.

It should be noted that, in the color conversion processing system according to the first embodiment of the present invention, the drawing command conversion unit 21 corresponds to the determining means, the type discriminating means and selecting means, and the printer output data generating unit 22 corresponds to the color conversion means.

A description will now be given of an operation of the color conversion processing system according to the above-mentioned first embodiment of the present invention. In the following description, a description will be given first of a method for color matching performed by the application using the drawing command.

(Color Matching Control by the Application)

A description will be given of a method for controlling the color matching which is performed by the application in the order of (1) printing process of an image, (2) selecting method for designating a color of object and (3) the color matching process.

(1) Image Printing Process

Figure 4:
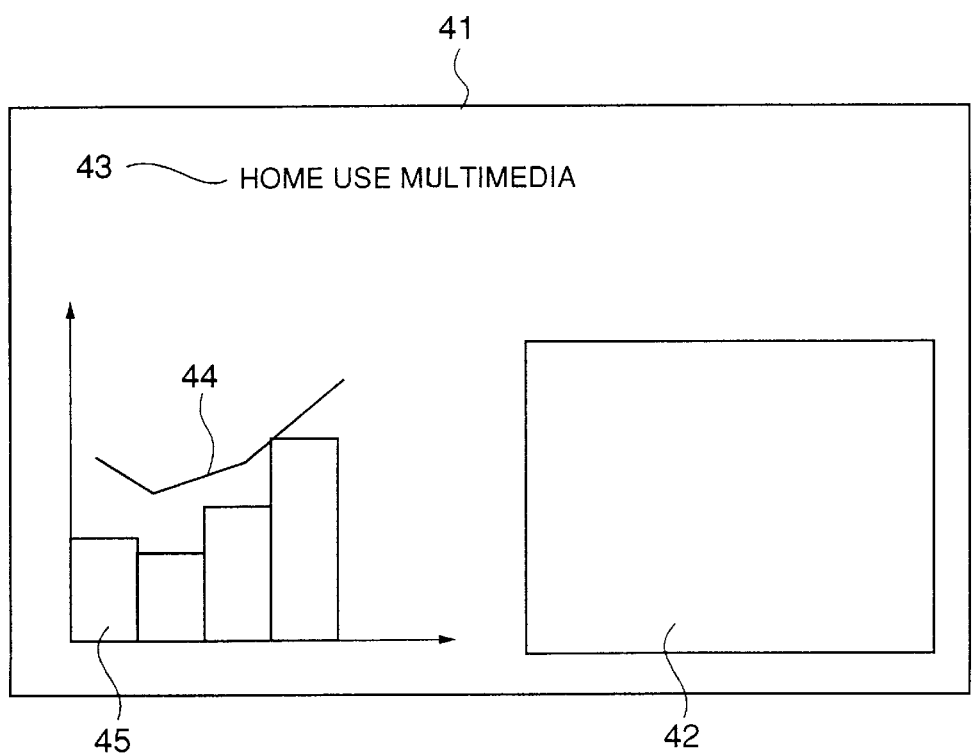
FIG. 4 is an illustration for explaining a color image including various objects.

FIG. 4 is an illustration for explaining a color image 41 including various objects. The color image 41 shown in FIG. 4 includes a natural image (bit map image) 42, a font image 43, a line image 44 and a single color painted pattern 45. A compound document of this type can be easily created by a conventional document creating application, and a demand for a high-quality image printing has been increased. A description will be given below, with reference to a case in which the color image 41 shown in FIG. 4 is printed, of a conventional printing process.

An operator draws the color image 41 shown in FIG. 4 on a display screen by using tools provided by the application 12. At this time, the document creating application stores the drawing data. Thereafter, the document creating application sends the stored drawing data to the printer driver 13 when printing is instructed.

Generally, an operating system is provided with the drawing module 11 shown in FIG. 1 so that the drawing module 11 can manage a display monitor and a printer.

* Output to the display monitor:

For example, when the color image 41 shown in FIG. 4 is drawn on the monitor screen, a drawing operation performed by using a tool of the application 12 is converted by the application 12 into a drawing command which can be interpreted by the drawing module 11, and the drawing command is sent to the drawing module 11. Thereafter, the drawing module 11 sends the drawing command to a driver for the monitor so that an image is drawn on the monitor screen by a device driver of the monitor.

* Output to the color printer:

A process similar to the process for drawing an image on the monitor screen is performed when printing is performed. When the operator outputs an image edited on the monitor by using the application 12, a command instructing a start of a printing job is sent from the application 12 to the drawing module 11. Upon receipt of the print start message, the drawing module 11 starts to send the drawing command in the similar manner of a case in which the drawing is performed on the monitor screen. The printer driver 13 interprets the drawing command from the drawing module 11 and converts into output data which can be interpreted by the printer. The output data is sent to the printer 14 which is connected via a local line or a network line. After the printing is completed, the application 12 sends a print end command to the drawing module 11, and the system is returned to a state in which the operator can perform an editing operation.

For example, when the output data is sent to a postscript printer, the printer driver 13 plays a role to convert the drawing command into a postscript code.

(2) Method for Designating a Color of an Object

A description will now be given of a method for designating a color of various objects. The drawing is performed on a unit basis of an object which is supported by the drawing module 11. The object herein refers to each figure such as a bit map image, a line image or a pattern image. A method for designating a color of an object is classified into the following three methods.

* Color designating method for bit map data:

A natural image such as a photographic image is represented by bit map data. Accordingly, each pixel of a natural image has RGB values, and the RGB values (pixel values) are sent to the device driver of the monitor or the printer. The drawing is performed by transferring the pixel values to a memory after a memory area is reserved in the memory for writing the bit map.

* Color designating method for a font image or a line image:

The font image or the line image is drawn in a single color in most cases. That is, in most cases, a text is written by a single color or line is drawn by a single color. Additionally, when a predetermined area is painted by a single color, the color designation is performed in the same manner as that for designating a color to a font image or a line image. With respect to the font image or the line image, generally, a drawing is started for an object after a color is designated. For example, when a green line is drawn after a title sentence is written in red, the operation is performed using the following procedure in most cases.

1. set a pen to red.
2. draw a font image
3. set the pen to green
4. draw a line image That is, a drawing tool referred to as a pen is set to a desired color, and the drawing is performed with the color assigned to the pen.

* Color designating method for a specific pattern:

The specific pattern refers to a gradation applied to a specified area or a font provided with a pattern. In this case, drawing is performed by using a plurality of colors. The method is different from that of the bit map image in that the bit map has color information for all pixels whereas the specific pattern is formed by coloring a predetermined area by enlarging, deforming or clipping a small bit map pattern.

A description will now be given of a drawing of a specific pattern with reference to an example in which a rectangle area including 200×100 pixels is painted over with a gradation changing from green to white. When a drawing is performed for a predetermined pattern, an object referred to as a pattern is produced. The pattern is represented by a bit map corresponding to a small area including, for example, 64×64 pixels. A bit map pattern having 64×64 pixels and changing from green to white is produced beforehand in the application. The bit map pattern is enlarged to an area including 200×100 pixels and the enlarged bit map pattern is painted over. Normally, the enlargement and painting are automatically performed by the drawing module. The drawing using a pattern is convenient especially when an area to be painted over is deformed.

(3) Color Matching Process

The color signals used in the above-mentioned three methods are RGB signals. Since the RGB signals are device dependent color signals, a color matching process cannot be achieved by the RGB signal without change. A description will now be given of a processing method when a color designation is made by the RGB signals.

An operating system which can perform a color matching is constructed so that a device independent color signal can be handled other than the RGB signals. The architecture itself is dependent on each operating system. That is, for example, there is a case in which a drawing is performed by using a drawing command exclusive for a color matching by the application or a case in which a code for a color matching is produced not by the application but the driver.

The color matching is performed by using the device profile 27 which describes characteristics of a device and the color conversion engine 24 performing a color conversion by using the device profile 27.

Generally, a physical relationship between the device independent signal such as a CIE XYZ or a CIE LAB and the device signal such as a monitor RGB or a printer CMYK is described in the device profile 27. For example, when the RGB signal for a monitor is converted into a CMYK signal for a printer, the color conversion engine 24 converts the RGB signal into the XYZ signal and then the converts the XYZ signal into the CMYK signal based on a profile of the printer. As mentioned above, a color representation having a uniform color characteristic can be achieved by using the device independent signal in the intermediate process.

However, a monitor and a printer are different from each other in a color representation range. Generally, the printer has a color representation range narrower than the monitor. Accordingly, when a color which can be represented by the monitor is output by the printer, this color which cannot be represented by the printer must be changed to a color which can be represented by the printer. This process is referred to a gamut mapping. There are various methods for the gamut mapping, and it is preferable to use different methods in accordance with types of images such as a natural image, a graph image or a font image. Accordingly, the color conversion engine 24 is constructed to perform a plurality of color conversion methods corresponding to various gamut mappings.

In order to facilitate the above-mentioned color matching, the operating system is generally provided with a module for the color matching. The module is provided with an interface for controlling access to the color conversion engine and the device profile.

A description will now be given of an operation of the drawing module 11 when the color matching is performed. When the color matching is performed, a designation of a color of an object is performed by using a color space for the color matching. Accordingly, the drawing module 11 calls a start command for the color matching. That is, the start command for the color matching is called so that the printer driver 13 can perform the color matching process.

Then, the drawing module 11 sets the color space of the color matching. The color space of the color matching includes various color spaces such as the RGB space, the XYZ space and the CMYK space. Attribute information specifies a relationship with a device independent color signal such as the XYZ signal. Accordingly, the attribute information must be set prior to setting the color space of the color matching. Generally, profile information of the monitor being used is used for the setting of the attribute information. For example, in order to set the RGB color space, the XYZ three-stimulation values of the maximum RGB value or the gamma value of the RGB value for the monitor may be set.

After the color space is set, the drawing of an object is started. A color designation of the object is dependent on the type of the produced color space. For example, when the XYZ space is set, the object is drawn by the XYZ value.

Finally, when the color matching is completed, an end command is called. That is, the end of the color matching is set by calling the end command.

The above-mentioned drawing command is sent from the drawing module 11 to the printer driver 13, and converted into code information of the printer. For example, when the postscript printer is used, the color signal designated in RGB is interpreted as a CIE based color signal by the printer driver 13, and is sent to the printer. Since the CIE based color signal is sent together with the attribute information of the RGB color space, a conversion from the RGB signal into the CMYK signal is enabled in conformity with a characteristic of the printer in a postscript interpreter. Thus, the color displayed on the monitor is represented by the printer without change.

On the other hand, the drawing command when the color matching is turned off is interpreted as a device signal in the postscript printer driver. When a color signal is sent as a device signal, the monitor output does not conform to the printer output since a characteristic of the printer is not considered.

In the above description, the postscript printer is described. However, when a raster image printer such as an inkjet printer is used, basically the same process can be applied, that is, the use of the color matching can be performed or stopped in accordance with a drawing command sent from the drawing module 11 with only a difference in a format of a code produced by the printer driver.

As mentioned above, in a system in which the color matching is controlled on the application side, a figure directly drawn by RGB is not subjected to the color matching when the color matching is not turned on. As a result, when an image is output from an application which does not support the color matching, the color matching cannot be performed even if the printer driver is compatible with the color matching.

(An Operation of the Color Conversion Processing System According to the First Embodiment)

In the architecture of the above-mentioned color matching, the object drawn when the color matching is turned off is sent to the printer as a device signal itself. Accordingly, in the color conversion processing system according to the first embodiment of the present invention, the printer driver 13 is expanded so that the object which is drawn when the color matching is off can be handled in the same manner as that of the object which is drawn when the color matching is turned on. Additionally, the color conversion processing system according to the first embodiment performs a suitable color matching process in consideration of the attribute of the drawing object when the drawing command is converted into an output code of the printer.

Figure 5:
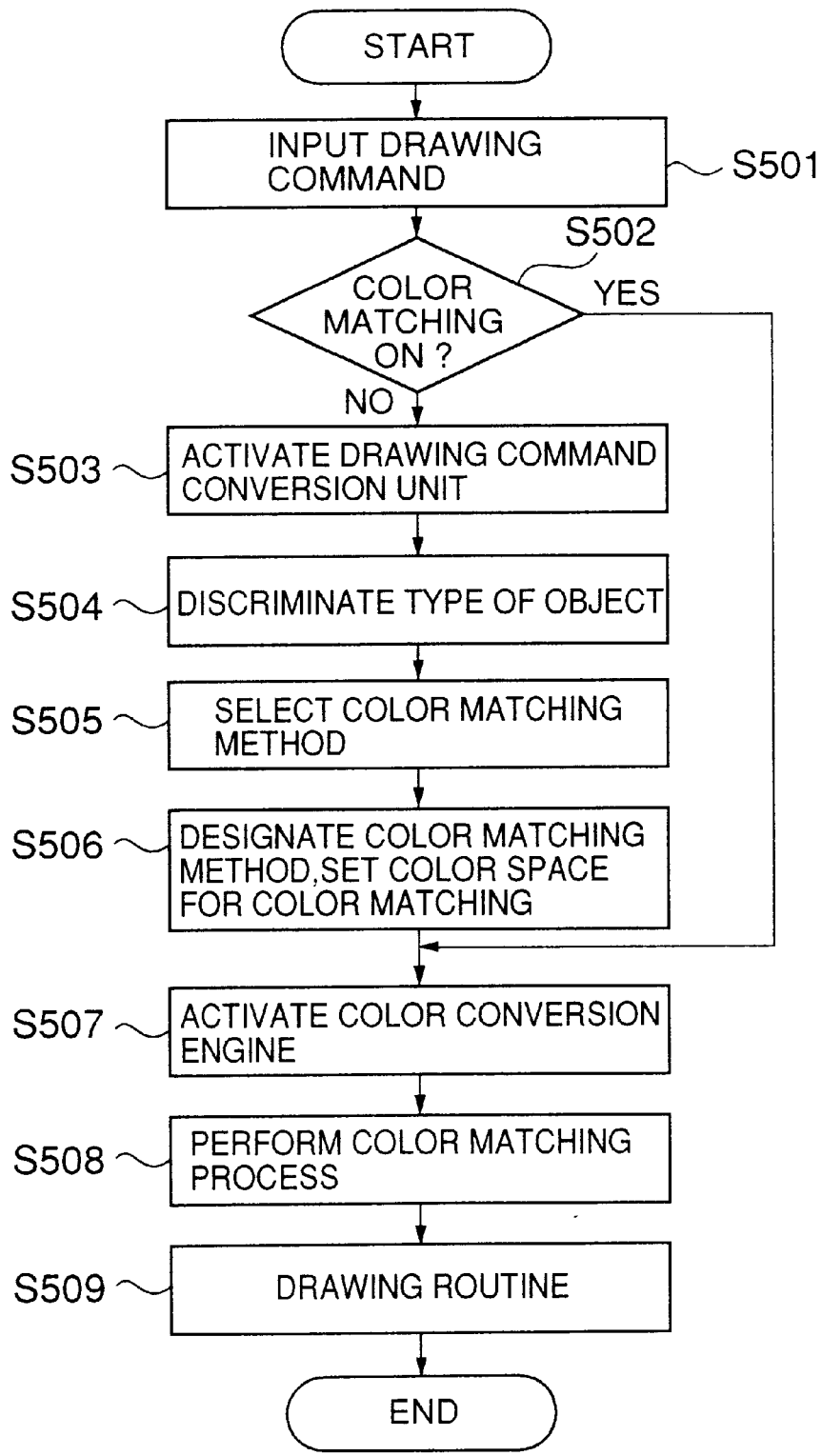
FIG. 5 is a flowchart of an operation of the color conversion processing system according to the first embodiment of the present invention.

A description will now be given of an operation of a color conversion processing system according to the present embodiment. FIG. 5 is a flowchart of the operation of the color conversion processing system according to the first embodiment of the present invention.

In step S501, the drawing module 11 outputs a drawing command received from the application 12 to the printer driver 13, and the printer driver 13 inputs the drawing command output from the printer driver 13.

The printer driver 13 determines, in step S502, whether or not the color matching for the input drawing command is turned on. If it is determined that the color matching is turned on, the routine proceeds to step S507. In step S507, the printer output data generating unit 22 activates one of the color conversion engines 24 to 26. Then, in step 508, the color matching process is performed by using a previously designated color matching method.

On the other hand, when the color matching is turned off, this means that the drawing command according to the RGB color is sent from the drawing module 11 to the printer driver 13 without being processed. Accordingly, in this case, the color matching process cannot be performed on the drawing command. Thus, the printer driver 13 activates, in step S503, the drawing command conversion unit 21 so that the drawing command conversion unit 21 performs a setting operation of the color space for the color matching.

In step S504, the drawing command conversion unit 21 discriminates a type of the object to which the input drawing command corresponds. After the type of the object is discriminated, the drawing command conversion unit 21 selects, in step S505, a color matching method corresponding to the type of the object from previously prepared information with respect to a correspondence between types of objects and color matching methods. Then, in step S506, the parameters of the color matching method in the drawing command are set as parameters corresponding to the selected color matching method.

That is, the drawing command conversion unit 21 calls the start command of the color matching as mentioned above, and sets the color space for the color matching. Attribute information for specifying a relationship with the device independent color signal such as the XYZ signal is described in the color space. When the drawing command of a bit map image is input, for example, the parameters of the color matching method in the drawing command are set to be a natural image mode. Additionally, when the drawing command of a font image is input, the parameters of the color matching method in the drawing command are set in a single color mode. However, a selection of the color matching method based on the type of the object is dependent on what color conversion engines are prepared in the color matching module 23. In the present embodiment, the color conversion engine 24 is provided for a natural image; the color conversion engine 25 is provided for a single color image; the color conversion engine 26 is provided for a pattern image.

The drawing command conversion unit 21 restructures the drawing command which is designated by the RGB values into a drawing command which is obtained when the color matching is turned on. The restructured drawing command is output to the printer output data generating unit 22.

The printer output data generating unit 22 analyzes, in step S507, the drawing command restructured by the drawing command conversion unit 21, and selects one of the engines 24 to 26 which corresponds to the parameters of the color matching method set in the drawing command so as to activate the selected engine. For example, when the parameter of the color matching method is set to the natural image mode, the natural image color conversion engine 24 is selected and activated. On the other hand, when the parameters are set to the single color mode, the single color image color conversion engine 25 is selected and activated.

For example, when the natural image color conversion engine 24 is activated, the natural image color conversion engine 24 converts the RGB signal of the bit map image into the CMYK signal by referring to the device profile 27 as shown in FIG. 3. That is, the natural image color conversion engine 24 converts the RGB signal into the device independent color signal such as the XYZ signal based on the profile of the monitor in the device profile 27, and thereafter converts the XYZ signal into the CMYK signal based on the printer profile. Additionally, the natural image color conversion engine 24 changes a color which cannot be represented by the printer to a color which can be represented by the printer since a color representing range of the printer is generally narrower than that of the monitor.

The color matching process is performed in the printer output data generating unit 22 as mentioned above, and the generated printer output data is output to the drawing module 11. It should be noted that the same process is applied to other objects, and the output data is sent to the drawing module 11. The drawing module 11 inputs the output data of the printer driver 13, and a drawing routine is performed in step S509 and then the present routine is ended.

According to the restructuring method of the drawing command by the drawing command conversion unit 21, a suitable color matching method can be achieved for each object. At this time, it is an important factor as to which color matching method is appropriate for each object.

In the present embodiment, there is no limitation on the selection of the color matching method. However, basically, it is preferable to change the color conversion mode in accordance with gradation of a drawing object.

That is, since the gradation is considered to be most important for an object in which a color is designated for each pixel as is in a bit map image, the gradation is greatly important for color representation. As for the method for the color representation attaching importance to the gradation, there is a method for compressing a color range which cannot be processed by a printer with a constant hue and brightness.

Figure 6:
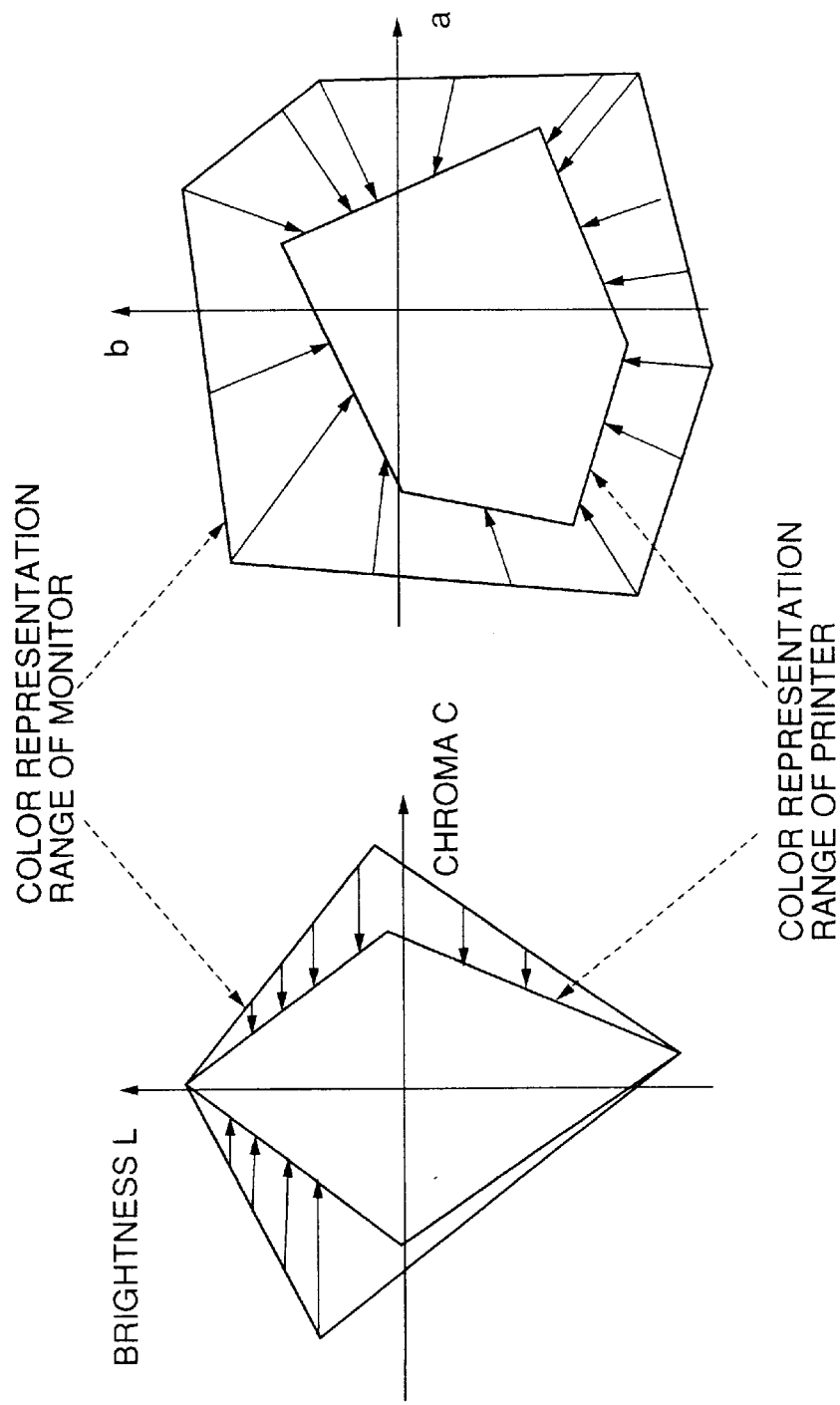
FIG. 6 is an illustration for explaining a method for mapping a color which cannot be represented by a printer with a constant hue and brightness when an object is a bit map image.
Figure 7:
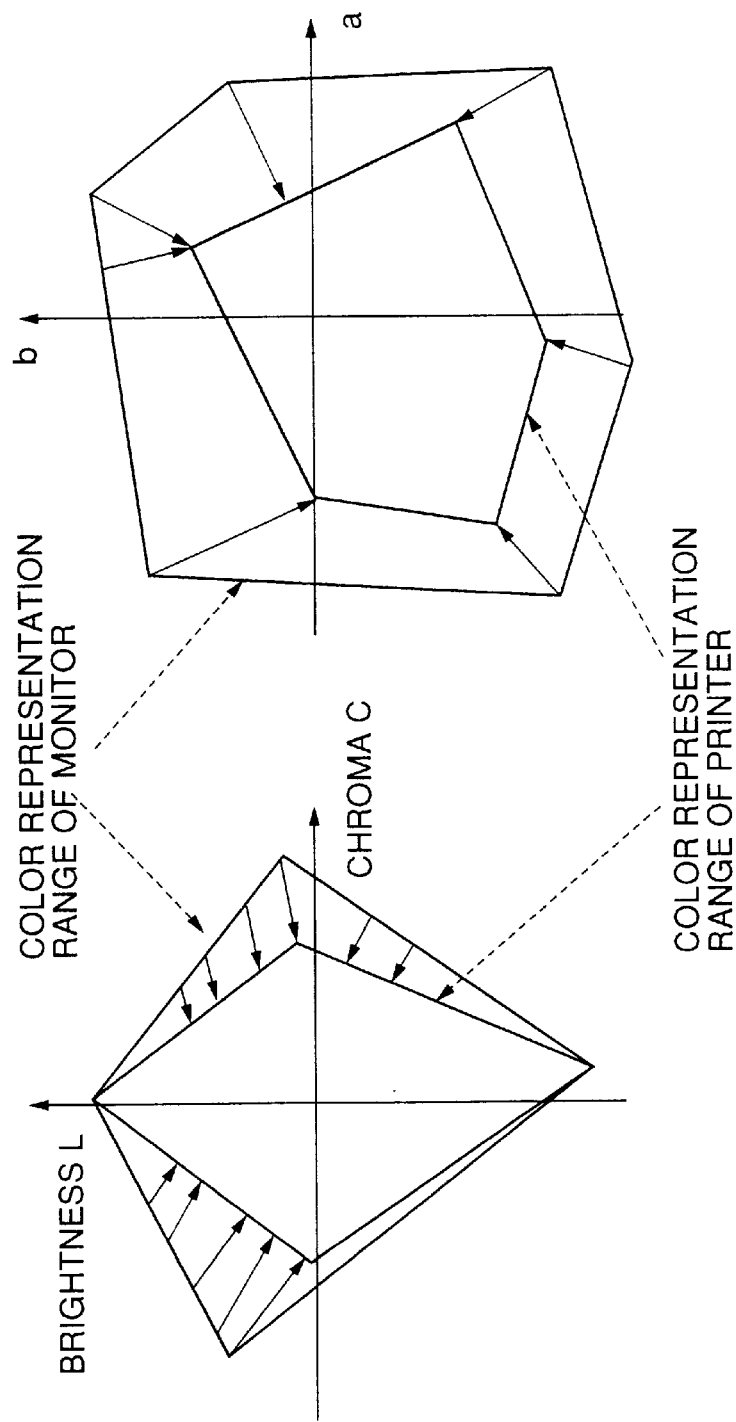
FIG. 7 is an illustration for explaining a method for mapping a color which cannot be represented by a printer to a color which has a smallest color difference when an object is a font or line image.

On the other hand, in a single color font or line image, the gradation is not important but conspicuousness is important in the color representation as shown in FIG. 6. Especially, a pure image in yellow or magenta can be represented without a rough feel, and is well distinguishable. Thus, a color representation having importance in chroma is performed with respect to a single, pure color image. As for the color representing method having importance in chroma, there is a method for mapping which provides a smallest color difference as shown in FIG. 7.

Additionally, a pure color image itself may be regarded as a device signal so as to perform the following color conversion without applying a color matching.

cyan=R−min(r,g,b)

magenta=G−min(r,g,b)

yellow=B−min(r,g,b)

black=min(r,g,b) Further, since both chroma and gradation are important to an object which is drawn by using a special pattern such as a gradation pattern or a design font, an intermediate color representation between the above-mentioned two color representation methods is used. Especially, since the gradation pattern is likely provided in an area adjacent to a pure color image, it is required to suppress a boundary distortion. Thus, a color having a low degree in chroma should be represented in a manner similar to that of a bit map image, while a color having a high degree in chroma is represented to have a conversion result similar to a case of a single color image. This adjustment in the color representation method can be easily performed by an interpolating calculation.

As mentioned above, in the color conversion processing system according to the first embodiment of the present invention, the drawing command designated by RGB values when the color matching is turned off is converted into the drawing command similar to that obtained when the color matching is turned on. Thereby, even in an application which does not support a color matching, a color matching process can be applied by the printer driver 13. Additionally, since the color matching method is switched in response to a type of object, a suitable color matching process can be achieved for each object.

Figure 8:
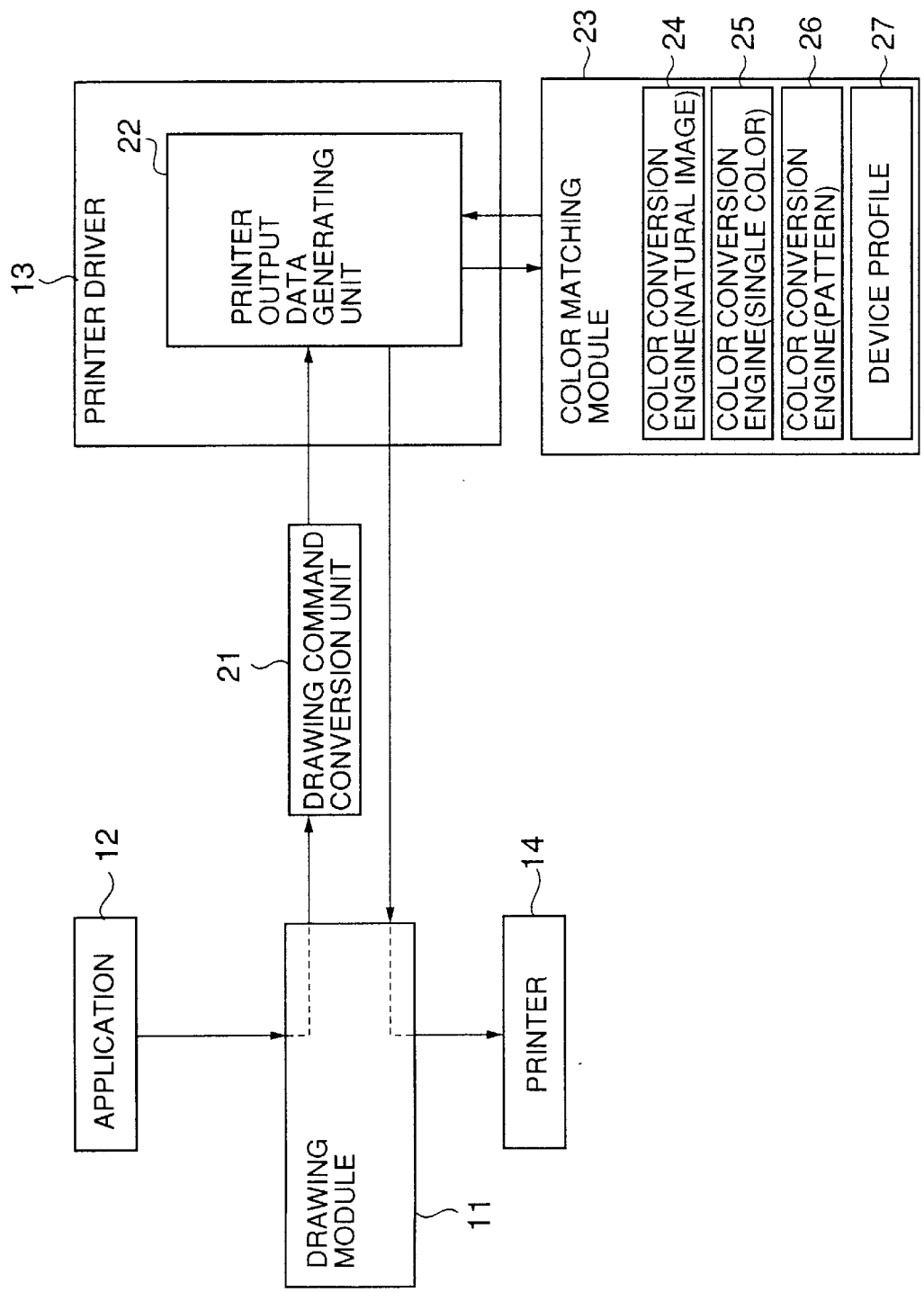
FIG. 8 is a block diagram of a variation of the color conversion processing system according to the first embodiment of the present invention.

It should be noted that, in the color conversion processing system according to the first embodiment of the present invention, the drawing command conversion unit 21, which performs the interruption process when the color matching is turned off, is provided in the printer driver 13. However, the present invention is not limited to this structure, and the drawing command conversion unit 13 may be provided between the drawing module 11 and the printer driver 13 as shown in FIG. 8. If the structure shown in FIG. 8 is used, the drawing command is sent to the printer driver 13 after a color space for a color matching is set by activating the drawing command conversion unit 21 by a control of the drawing module 11.

Additionally, although a color image drawn on the monitor screen is printed out by the printer 14 in the first embodiment, the present invention is not limited to this method. That is, the color conversion processing system according to the first embodiment of the present invention can be applied to any case which requires a color matching process.

Second Embodiment

A description will now be given of a second embodiment of the present invention. In a color conversion processing system according to the second embodiment of the present invention, an on/off operation of a color matching can be performed by a printer driver. However, a color matching method for each object in a color image is controlled by an application, and a color matching method is designated in an attribute of an object. That is, the color conversion processing system according to the second embodiment generates data to be sent to a color output apparatus in accordance with the attribute information after the attribute information of a color matching is added in response to a type of the object when the drawing object having no attribute of color matching is received. It should be noted that the second embodiment will be described with reference to an example in which a color image drawn on the monitor screen is output from a printer similar to the first embodiment. In the description of the second embodiment, descriptions of structures the same as the structures of the first embodiment will be omitted.

Figure 9:
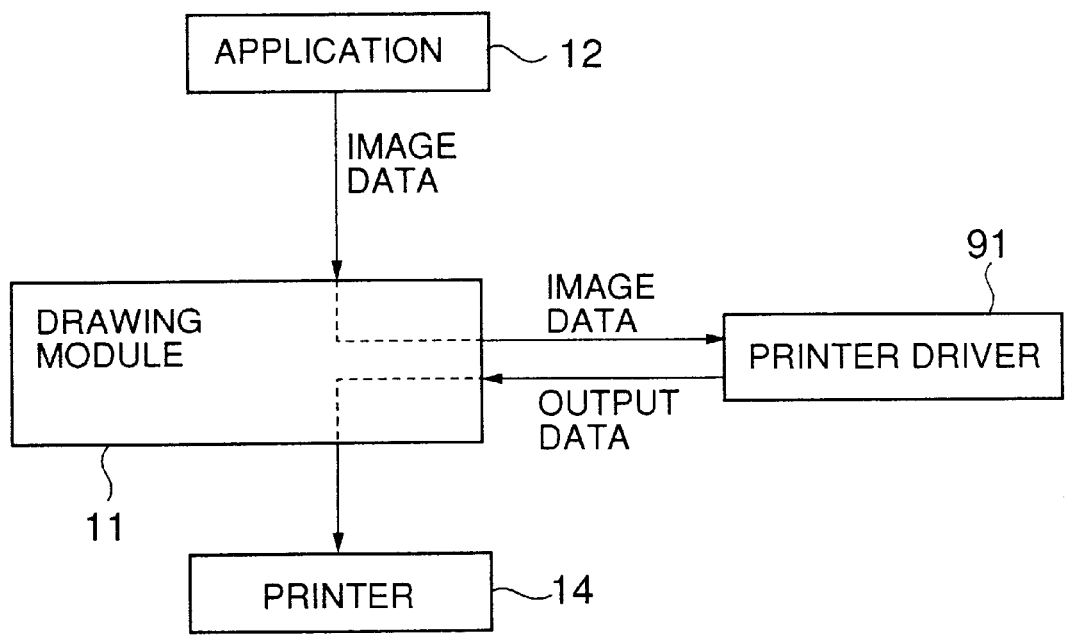
FIG. 9 is a block diagram of the color conversion processing system according to a second embodiment of the present invention.

FIG. 9 is a block diagram of the color conversion processing system according to the second embodiment of the present invention. The color conversion processing system according to the second embodiment comprises the drawing module 11 and a printer driver 91. The printer driver 91 receives image data from the drawing module 11, and applies a color matching process so as to convert the image data into the output data which is output to the printer 14.

Figure 10:
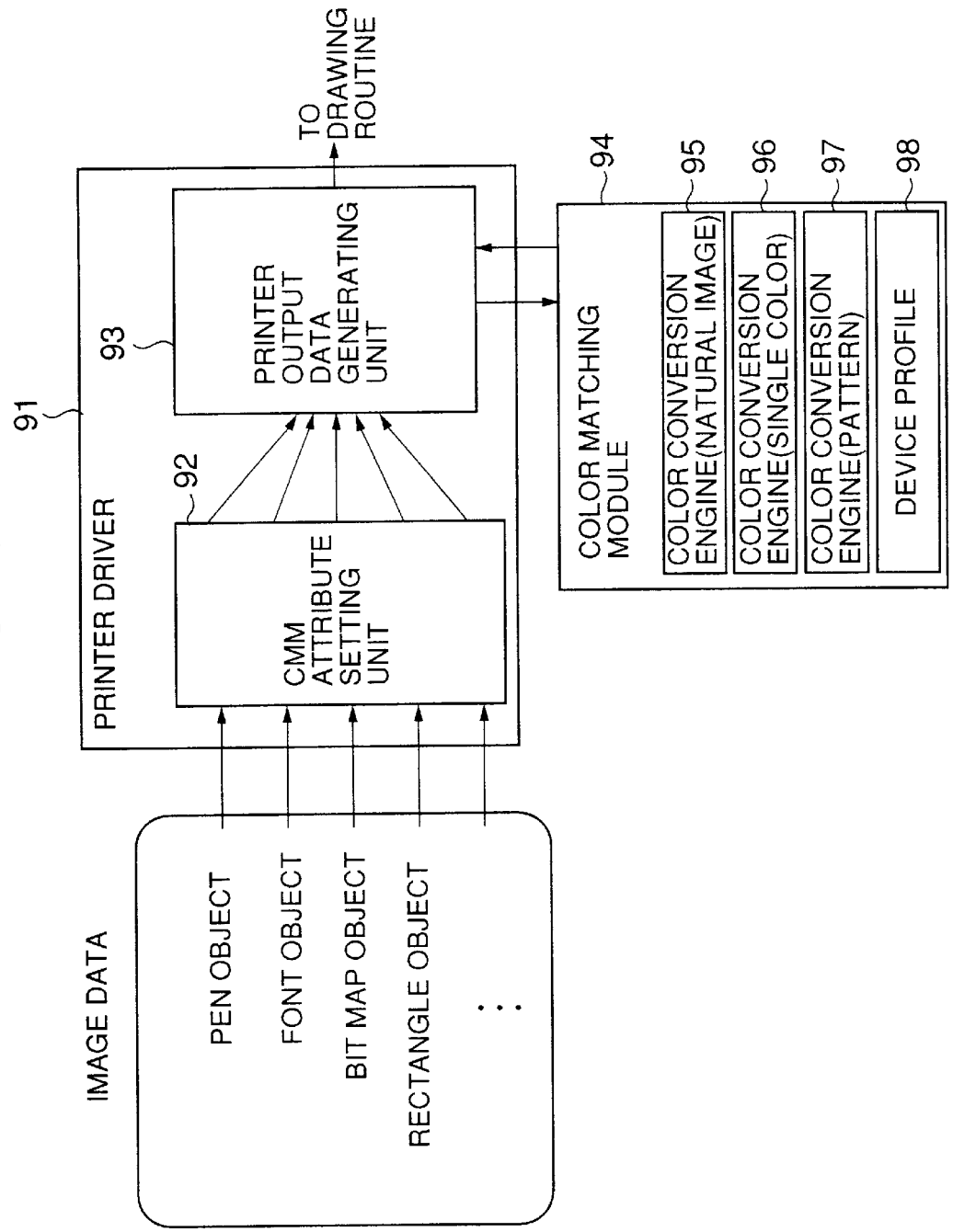
FIG. 10 is a block diagram of a printer driver shown in FIG. 9.

FIG. 10 is a block diagram of the printer driver 91 shown in FIG. 9. The printer driver 91 can control an on/off operation of the color matching. The printer driver 91 comprises a color matching method (CMM) attribute setting unit 92 and a printer output data generating unit 93. The CMM attribute setting unit 92 adds, when an attribute of the color matching is not assigned to an object to be drawn, attribute information of a color matching method to the object by an interruption process. The printer output data generating unit 93 performs the color matching process for each object in accordance with the attribute information added by the CMM attribute setting unit 92, and converts the image data into output data which is output to the color image outputting apparatus.

When the attribute of the color matching method is not assigned to the object to be drawn, the CMM attribute setting unit 92 is activated as an interruption module. By the interruption process of the CMM attribute setting unit 92, a type of the object to be drawn is discriminated. A color matching method corresponding to the discriminated type is selected and the attribute information of the selected color matching method is added to the object.

The printer output data generating unit 93 is provided with a color matching module 94. The color matching module 94 includes a device profile 98 and a plurality of color conversion engines 95, 96 and 97. The device profile 98 stores a characteristic of each device. The color conversion engines 95 to 97 perform the color matching process by using the device profile 98. The printer output data generating unit 93 activates one of the color conversion engines 95 to 97 in accordance with the attribute information of the color matching method added by the CMM attribute setting unit 92 so as to perform the color matching process by using the device profile 98.

It should be noted that, in the color conversion processing system according to the second embodiment of the present invention, the CMM attribute setting unit 92 corresponds to the determining means, the type discriminating means and the attribute adding means, and the printer output data generating unit 93 corresponds to the color conversion means.

Figure 11:
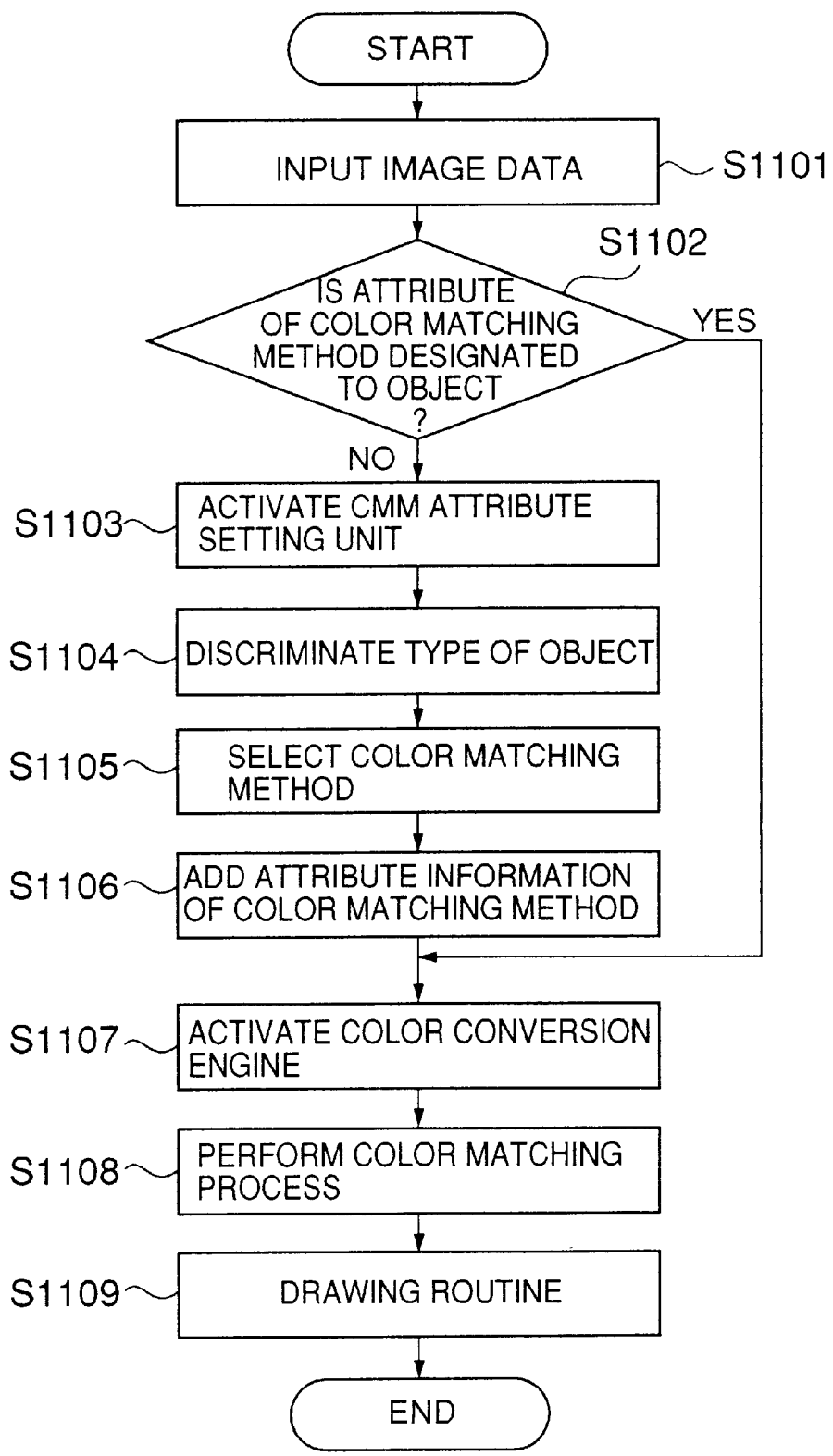
FIG. 11 is a flowchart of an operation performed by the color conversion processing system according to the second embodiment of the present invention.

A description will now be given of an operation of the color conversion processing system according to the above-mentioned second embodiment of the present invention. FIG. 11 is a flowchart of an operation performed by the color conversion processing system according to the second embodiment of the present invention.

There is an operating system in which a color matching is turned on and off originally by a device driver. However, even in such an operating system, a color conversion mode for each object may be provided on the assumption that the control is performed by an application.

In such an operating system, information with respect to a color matching is described in the attribute of an object in most cases. Accordingly, the driver switches the color matching in accordance with the attribute of the object. However, when the attribute of the color matching method is not assigned to the object, a default color conversion method is used.

In the color conversion processing system according to the second embodiment of the present invention, the drawing module 11 receives image data from the application 12, and outputs the image data to the printer driver 91. The printer driver 91 inputs, in step S1101, the image data output from the drawing module 11.

The printer driver 91 determines, in step S1102, whether or not the attribute of the color matching is designated to each object in the input image data. If the attribute of the color matching is designated to the object, the routine proceeds to step S1107. In step S1107, the printer output data generating unit 93 activates one of the color conversion engines 95 to 97. Then, a color matching process using a previously designated color matching method is performed in step S1108.

When an attribute of a color matching method is not designated to the object, the printer driver 91 activates the CMM attribute setting unit 92 as an interruption process in step S1103. The CMM attribute setting unit 92 discriminates, in step S1104, a type of the object to be drawn.

After the type of the object is discriminated, the CMM attribute setting unit 92 selects, in step S1105, a color matching method corresponding to the type of the object from the correspondence information between a type of object and a color matching method. Then, in step S1106, the CMM attribute setting unit 92 adds the attribute information of the selected color matching method to the object.

In step S1107, the printer output data generating unit 93 selects a corresponding color conversion engine in the color matching module 94 in accordance with the attribute information added by the CMM attribute setting unit 92, and activates the selected color conversion engine. Thus, the color matching process is performed in step S1108.

The color matching process is performed in the printer output data generating unit 93 in the above-mentioned procedure, and the produced printer output data is output to the drawing module 11. It should be noted that a similar process is performed for other objects, and the output data is sent to the drawing module 11. The drawing module 11 inputs the output data of the printer driver 91, and enters a drawing routine using the printer 14 in step S1109. Then, the color matching process is ended.

It should be noted that the correspondence relationship between a type of the object and a color matching method is similar to that of the first embodiment, and a detailed description thereof will be omitted.

As mentioned above, in the color conversion processing system according to the second embodiment, when the attribute of the color matching is not designated to the object, an appropriate color matching process can be performed for each object present in the image data by adding the attribute information of the color matching method corresponding to the type of the object.

Figure 12:
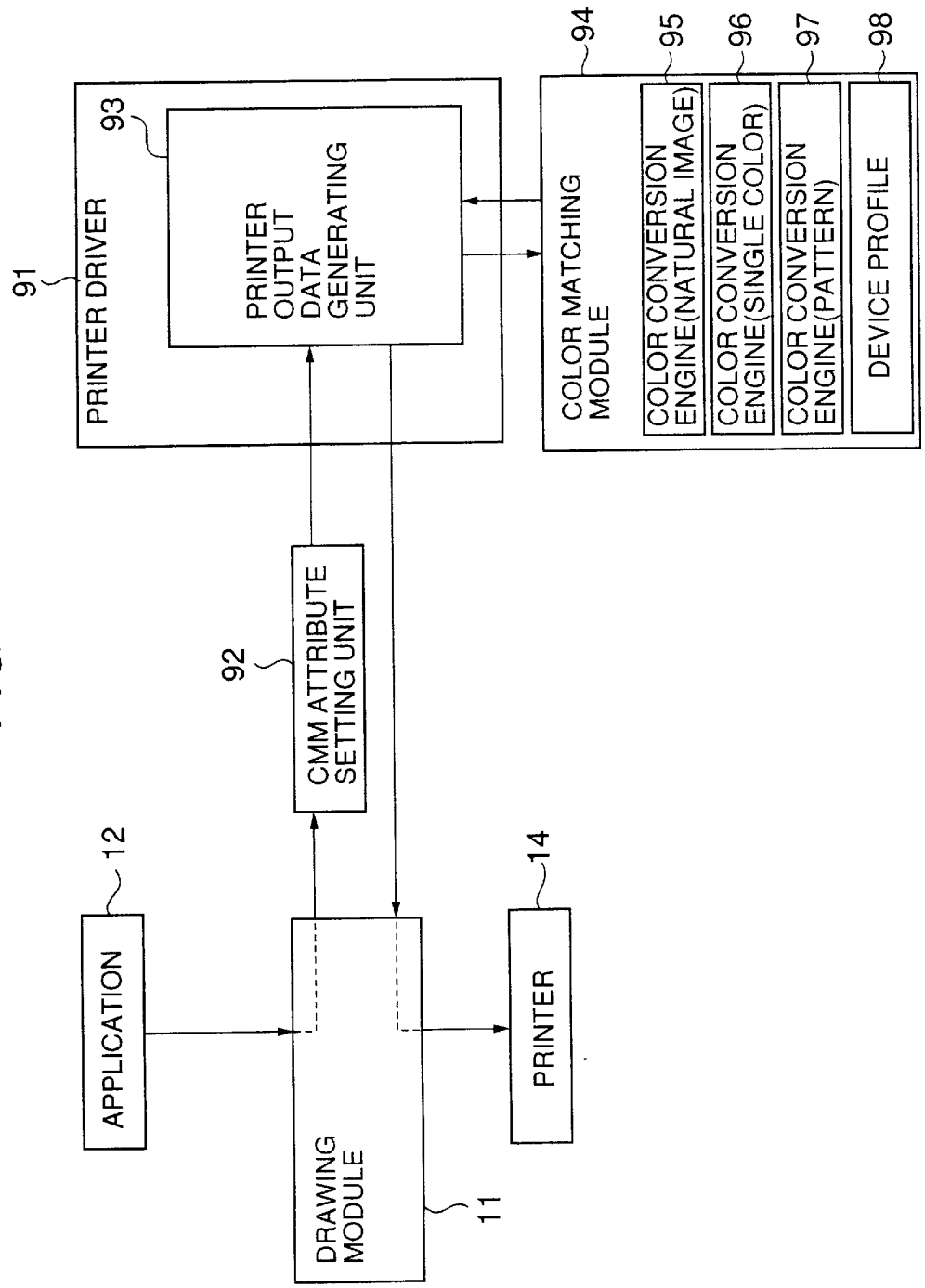
FIG. 12 is a block diagram of a variation of the color conversion processing system according to the second embodiment of the present invention.

It should be noted that, in the color conversion processing system according to the second embodiment of the present invention, the CMM attribute setting unit 92, which performs the interruption process when the color matching method is not designated to each object, is provided in the printer driver 91. However, the present invention is not limited to this structure, and the CMM attribute setting unit 92 may be provided between the drawing module 11 and the printer driver 91 as shown in FIG. 12. When the structure shown in FIG. 12 is used, the image data is sent to the printer driver 91 after the attribute information of the color matching method is added to each object by activating the CMM attribute setting unit 92 by a control of the drawing module 11.

Additionally, although a color image drawn on the monitor screen is printed out by the printer 14 in the second embodiment, the present invention is not limited to this method. That is, the color conversion processing system according to the second embodiment of the present invention can be applied to any case which requires a color matching process.

Third Embodiment

A description will now be given of a third embodiment of the present invention. In the third embodiment, a color matching process corresponding to a type of an object can be performed without producing a new printer driver. That is, a color matching process corresponding to a type of an object is performed by expanding a function of an existing printer driver.

In the present circumstance related to personal computers, a printer driver is provided as a dynamic linking program module. Accordingly, in the third embodiment of the present invention, a method for expanding the function of the dynamic linking program module is suggested so that this system is applied to an existing printer driver to apply a color matching method which differs for each object. However, it should be noted that this method for expanding a program module is not only for an expansion of a printer driver but also for an expansion of other dynamic linking program modules.

Figure 13:
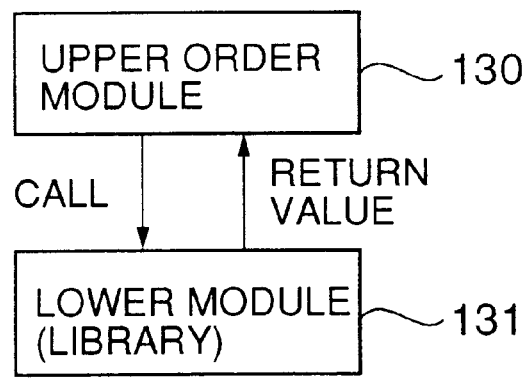
FIG. 13 is an illustration for explaining a method for expanding a dynamic linking program module according to a third embodiment of the present invention.

As shown in FIG. 13, in software, an upper order module 130 calls a lower order module 131 (for example, a library).

The called lower order module 131 performs a predetermined process and returns a result (return value) of the process to the upper order module 130.

In a multi task circumstance in which a plurality of programs run concurrently, in order to avoid duplex loading of a library to a memory, the library is set as a dynamic linking program module so that the library is shared by a plurality of applications. The dynamic linking library refers to, for example, a dynamic link library (DLL) in Windows (Registered Trade Mark) or UNIX (Registered Trade Mark) or a component in Macintosh (Registered Trade Mark). It should be noted that in the following description, the dynamic linking program module is explained as a DLL.

The DLL is an assembly of routines which is dynamically linked to other modules and is called. Generally, a header of the DLL file is provided with a list of routine names which can be called by other modules. Here, a condition in which a routine can be called by other modules is expressed by a term "exported". As a result, an upper order module can call an exported routine by designating a file name of the routine and a routine name (routine number).

Figure 14:
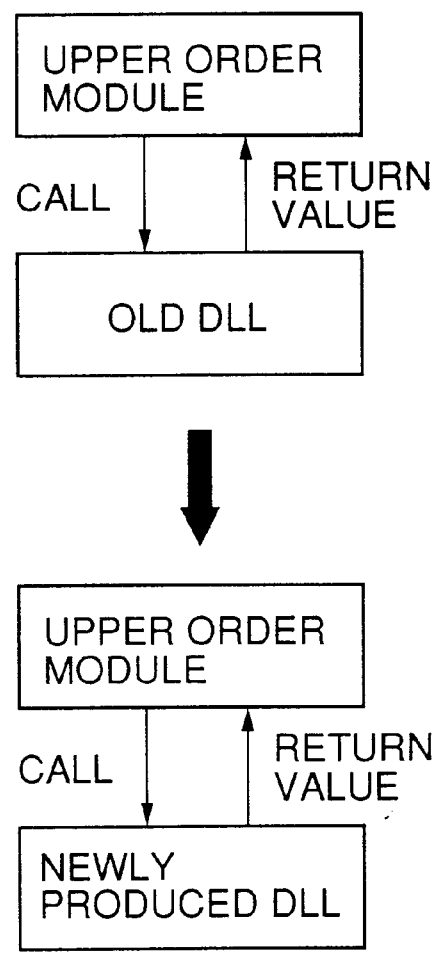
FIG. 14 is an illustration for explaining the method for expanding a dynamic linking program module according to the third embodiment of the present invention.

Conventionally, in order to expand a function of the DLL, programs thereof should be edited and compiled to produce a new DLL so that an old DLL is replaced with the new DLL, as shown in FIG. 14. However, when the old DLL is previously produced by others and when a source program is not available, the new DLL must be produced from a first stage. Otherwise, the expansion of the DLL must be abandoned. When the DLL is produced from the first stage, an interface between the upper order module and the DLL, that is, an argument and a return value of the exported routine, must be known.

In the following description, the method for expanding a dynamic linking program module according to the third embodiment is explained on the assumption that the argument and the return value of the exported routine are known.

Figure 15:
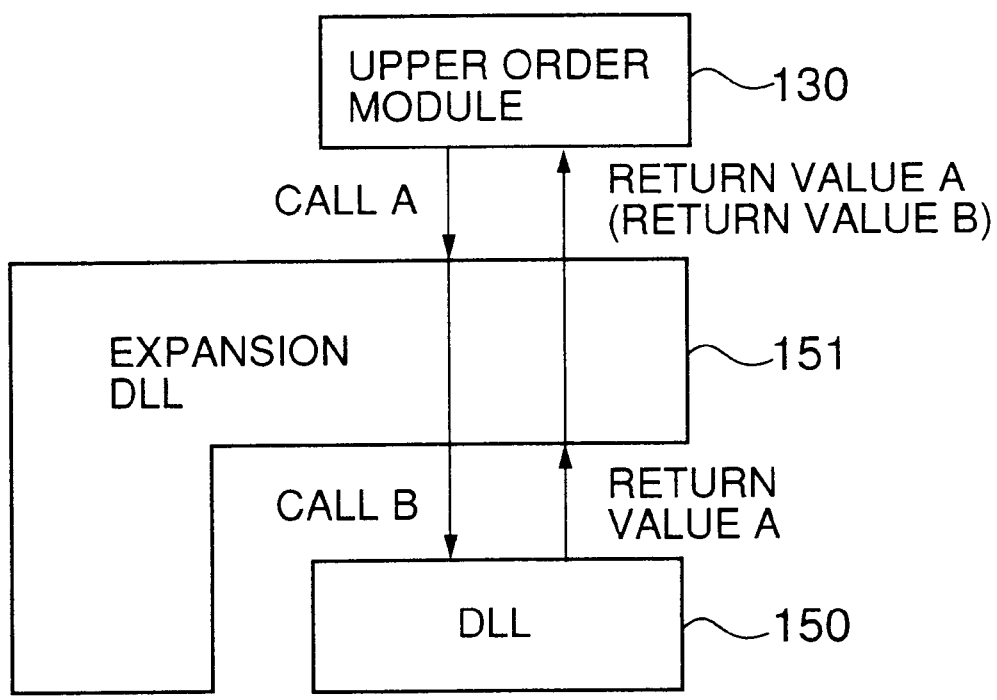
FIG. 15 is an illustration for explaining a first example of the method for expanding a dynamic linking program module according to the third embodiment of the present invention.

FIG. 15 is an illustration for explaining a first example of the method for expanding a dynamic linking program module according to the third embodiment of the present invention. In FIG. 15, a DLL 130 corresponds to the above-mentioned upper order module, a DLL 150 corresponds to the DLL of which function is to be expanded, and a DLL 151 corresponds to an expansion DLL for expanding the function of the DLL 150.

Additionally, in FIG. 15, the file name of the DLL 150 is changed to another name, and the expansion DLL 151 is given the original file name of the DLL 150. The expansion DLL 151 exports all of the routines which the DLL 150 exports so that all calls issued from the upper order module 130 to the routines included in the DLL 150 can be received. Accordingly, if the upper order module 130 calls by designating the file name of the DLL 150, the routine having the same name in the expansion DLL 151 is called consequently. Then, the expansion DLL 151 changes an arbitrary argument of the call, if necessary, so as to call the DLL 150 so that the function of the DLL 150 can be expanded.

Figure 16:
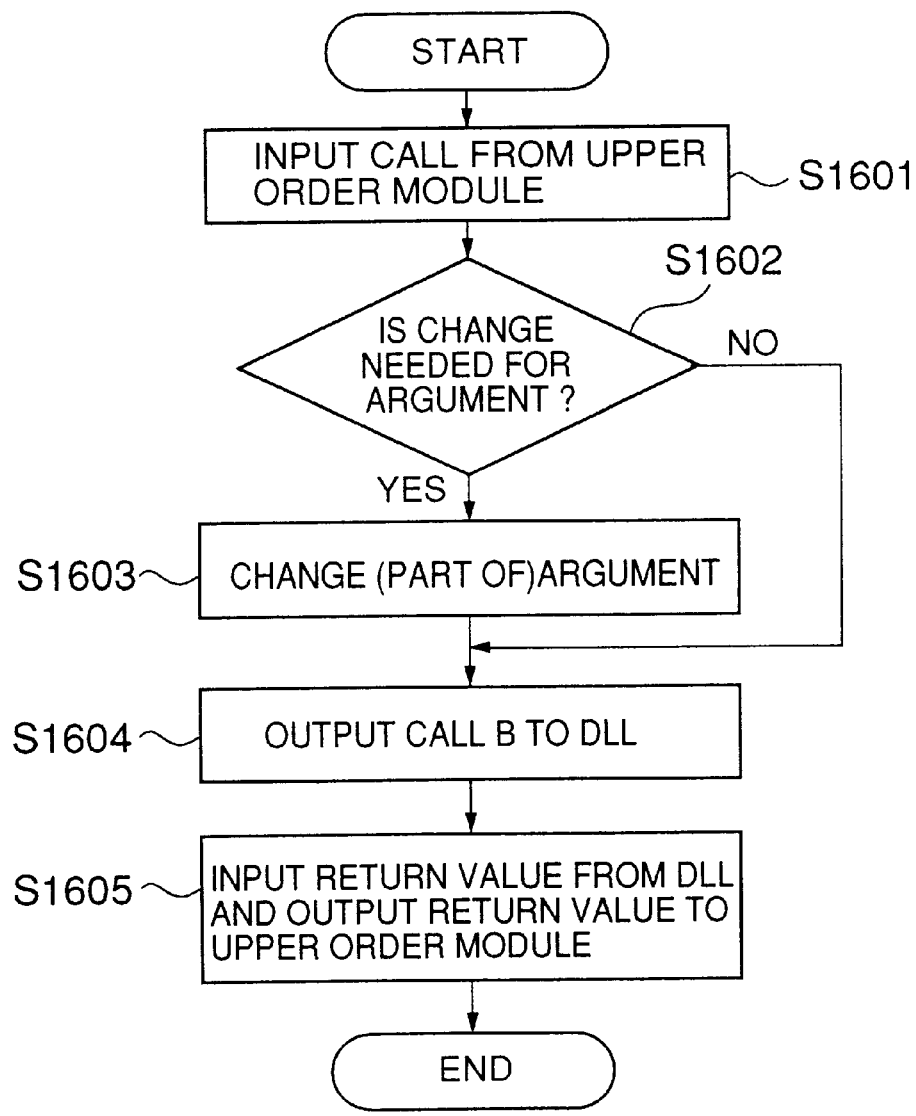
FIG. 16 is a flowchart of the first example of the method for expanding the dynamic linking program module.

A description will now be given, with reference to a flowchart of FIG. 16, of an operation of the expansion DLL 151. When the upper order module 130 outputs a call A by designating the file name and the routine name of the DLL 150, the expansion DLL 151 inputs the call A in step S1601.

In step S1602, the expansion DLL 151 determines whether or not a change is needed for an argument in the input call A based on a previously set condition. If the change is not needed, the routine proceeds to step S1604 so as to change the name of the call A to call B and output the call B to the DLL 150 without changing the argument.

On the other hand, if the argument must be changed, a part of the argument in the call A is changed and a new call B is generated in step S1603. The generated call B is output, in step S1604, to the DLL 150. The argument to be changed is one which is necessary for an expansion of the function. Such an argument is previously set in the DLL 151.

Thereafter, the DLL 150 performs a predetermined process based on the call B, and outputs the return value A which is a result of the process to the expansion DLL 151. In step S1605, the expansion DLL 151 inputs the return value A from the DLL 150 and outputs the return value A to the upper order module 130, and then the routine is ended. Since the return value A output from the expansion DLL 151 corresponds to the call B, the return value A is different from the return value output from the upper order module 130 which corresponds to the call A. However, the expansion DLL 151 may output the return value A to the upper order module 130 as a different return value B. Additionally, the return value returned from the expansion DLL 151 to the upper order module 130 may be the return value A which corresponds to the call B and is returned by the DLL 150, or the different return value B may be returned as mentioned above. At this time, the return value B may be the original value corresponding to the call A from the upper order module 130. Additionally, if it is determined that the change in the argument is not necessary and the call B is output to the DLL 150 in steps S1602 and S1604 of FIG. 16, the return value is assumed to be the return value A corresponding to the call A.

As mentioned above, when the expansion DLL 151 changes the call A which is output from the upper order module 130 to the DLL 150, a different return value is returned to the upper order module 130. This provides a result similar to a result of a process in which the DLL 150 is replaced with a new DLL with respect to the upper order module 130.

Figure 17:
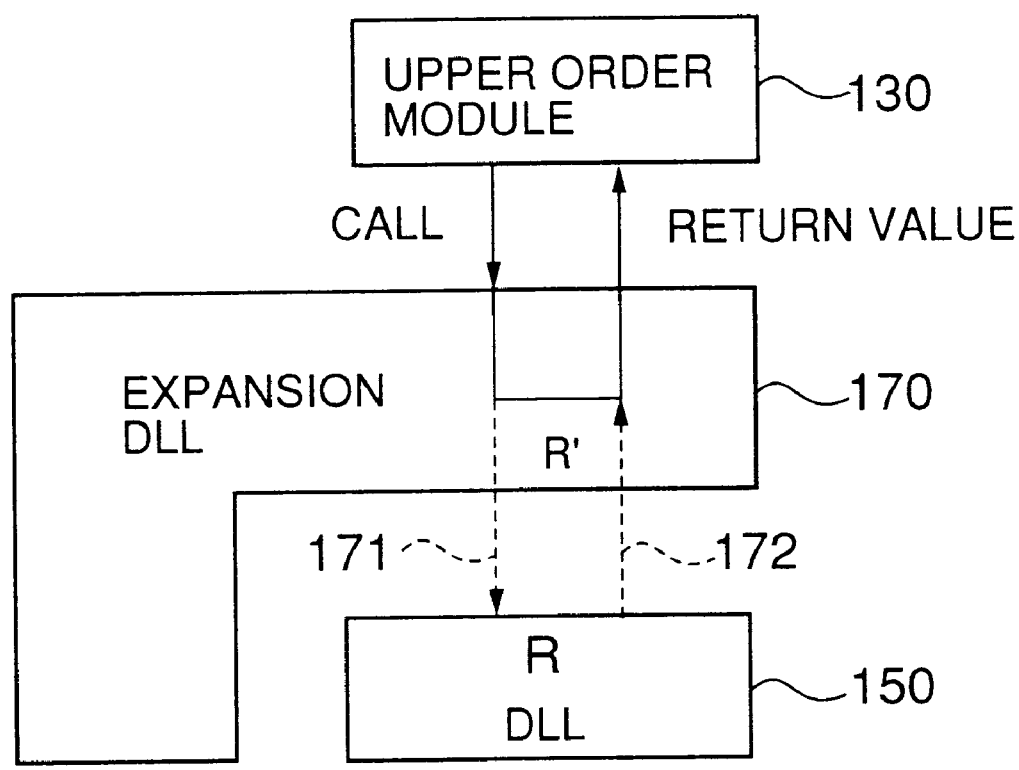
FIG. 17 is an illustration for explaining a second example of the method for expanding the dynamic linking program module according to the third embodiment of the present invention.

FIG. 17 is an illustration for explaining a second example of the method for expanding the dynamic linking program module according to the third embodiment of the present invention. An expansion DLL 170 shown in FIG. 17 includes a new routine R' having a name the same as that of the routine R of the DLL 150. The expansion DLL 170 performs a process based on the routine R' when a call designating the routine R is output from the upper order module 130 to the DLL 150, and outputs a return value, which is different from the return value based on the routine R of the DLL 150, to the upper order module 130.

Figure 18:
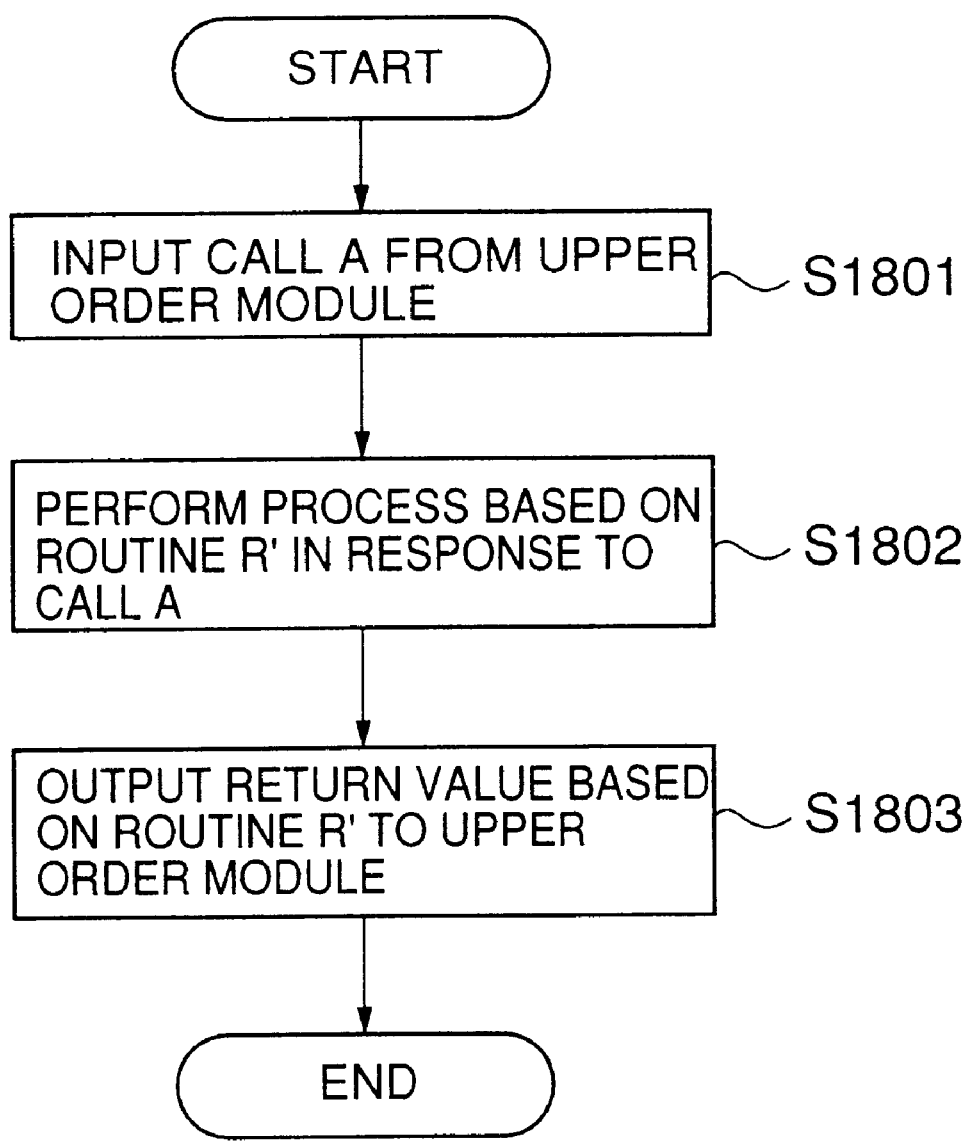
FIG. 18 is a flowchart of an operation of an expansion DLL shown in FIG. 17.

A description will now be given, with reference to a flowchart of FIG. 18, of an operation of the expansion DLL 170.

In step S1801, when the upper order module 130 outputs a call designating the file name and the routine R of the DLL 150, the expansion DLL 170 inputs the call. The expansion DLL 170 performs, in step S1802, a process based on the routine R' which corresponds to the routine R designated by the call. The routine R' may include a step for performing a predetermined process by calling the DLL 150 (refer to a dotted arrow 171 in FIG. 17).

Thereafter, the expansion DLL 170 outputs, in step S1803, a return value which is a result of the process based on the routine R' to the upper order module 130, and the routine is ended. It should be noted that when the predetermined process is performed by the DLL 150, the expansion DLL inputs the return value (refer to a dotted arrow 172 in FIG. 17) and generates a return value to be output to the upper order module 130 by using the input return value.

As mentioned above, the expansion module 170 includes the routine having a name the same as that of the routine of the DLL 150 and, thereby, the function of the DLL 150 can be freely and directly expanded.

Figure 19:
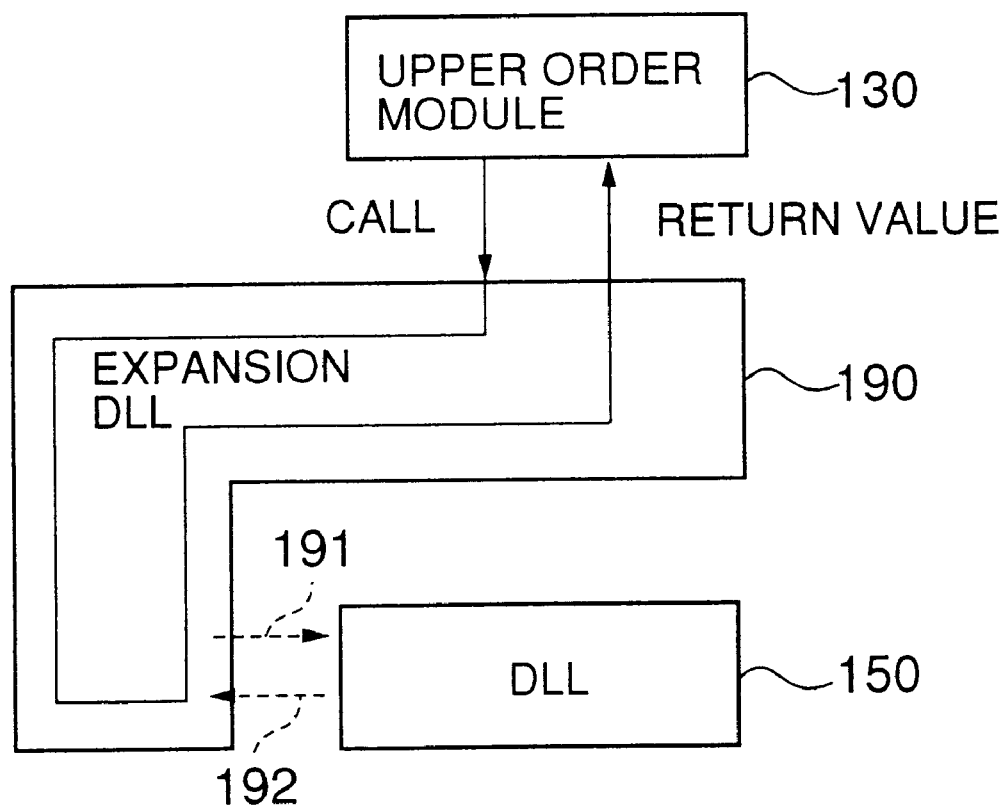
FIG. 19 is an illustration for explaining a third example of the method for expanding the dynamic linking program module according to the third embodiment of the present invention.

FIG. 19 is an illustration for explaining a third example of the method for expanding the dynamic linking program module according to the third embodiment of the present invention. An expansion DLL 190 shown in FIG. 19 has an interface other than the interface between the upper order module 130 and the DLL 150. That is, the expansion DLL 190 is provided with a new exported routine which is not included in the DLL 150 and can be called by the upper order module 130.

Figure 20:
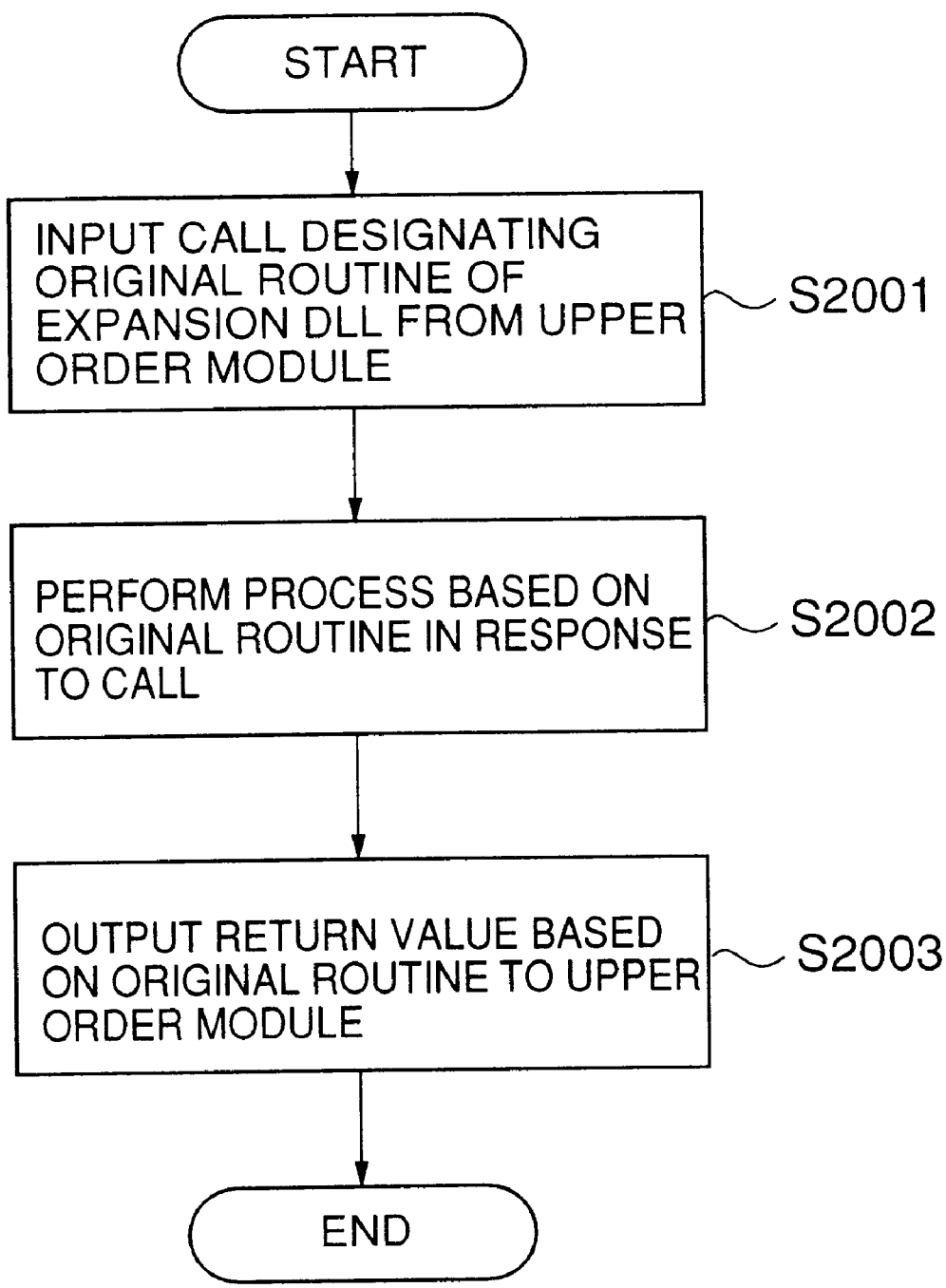
FIG. 20 is a flowchart of an operation of an expansion DLL shown in FIG. 19.

A description will now be given, with reference to a flowchart of FIG. 20, of an operation of the expansion DLL 190. The expansion DLL 190 inputs, in step S2001, a call designating a newly provided routine (original routine of the expansion DLL 190) from the upper order module 130. Then, in step S2002, the expansion DLL 190 performs a predetermined process based on the designated routine. It should be noted that when the DLL 150 performs the predetermined process, the expansion DLL 190 inputs a return value thereof (refer to a dotted arrow 192 in FIG. 19), and generates a return value output to the upper order module 130 by using the input return value, in step S2003.

As mentioned above, the DLL 190 is provided with the routine which is not included in the DLL 150 so that the process can be performed based on the routine provided to the DLL 190. Thereby, the function of the DLL can be expanded by the process corresponding to the routine provided to the DLL.

It should be noted that, in the above-mentioned first to third examples, the return value may be an output argument (an argument written by a called DLL). Additionally, an expansion DLL may be formed by a combination of the first to third examples. Further, although all of the routines which are exported by the DLL are exported by the expansion DLL, only necessary routines may be exported by the expansion DLL when there is an unnecessary function in the DLL.

A description will now be given of a color conversion processing system and method which uses the above-mentioned method for expanding the dynamic linking program module.

Fourth Embodiment

The fourth embodiment of the present invention is related to an expansion of a function of an existing printer which is compatible with a color matching but not able to designate a color matching method for each object.

Figure 21:
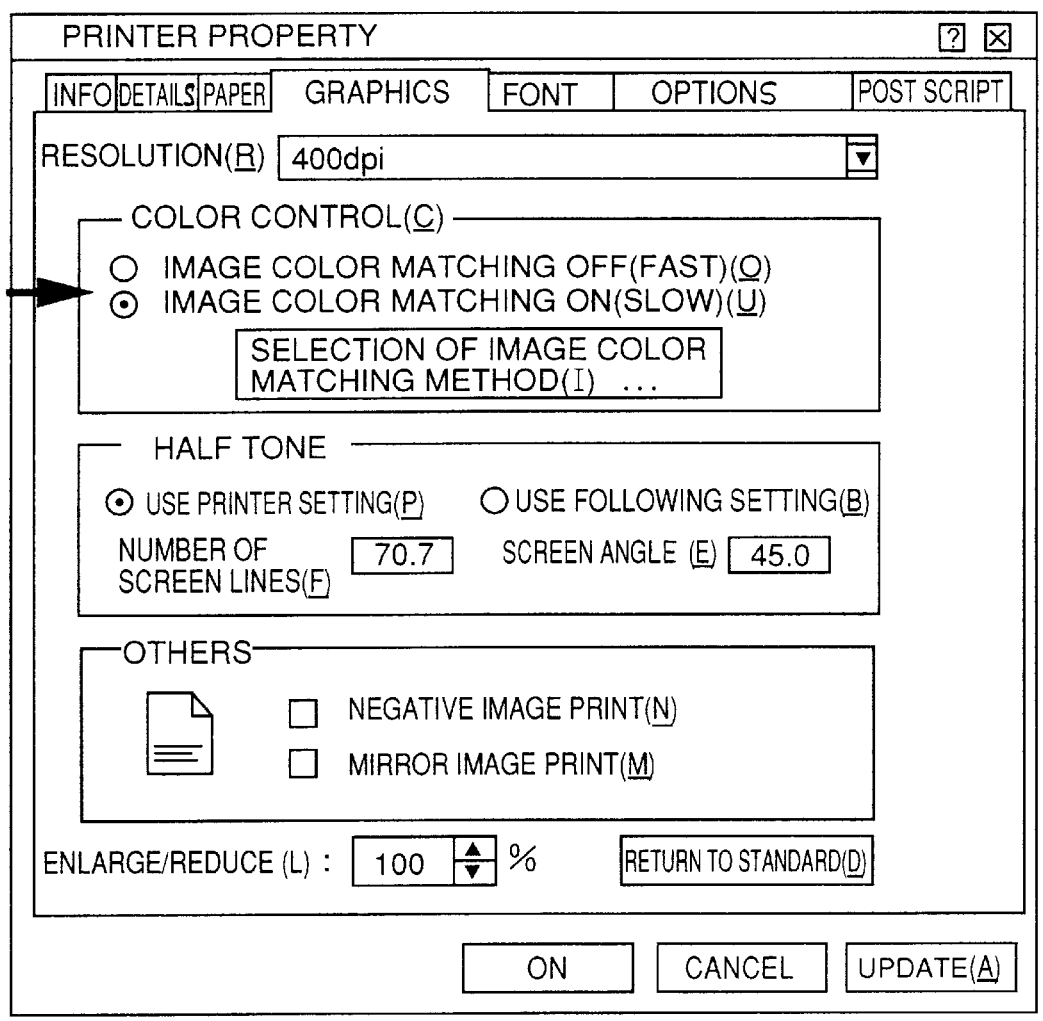
FIG. 21 is an illustration of a setting screen for designating an application of a color matching provided by a printer driver used in a color conversion processing system according to a fourth embodiment of the present invention.

FIG. 21 is an illustration of a setting screen for designating an application of a color matching provided by a printer driver used in a color conversion processing system according to the fourth embodiment of the present invention. This setting screen is based on a setting screen provided by a standard postscript printer driver used in a conventional operating system. order module 130 described in the third embodiment; 212 indicates an expansion printer driver corresponding to the expansion DLLs 151, 170 and 190 described in the third embodiment; 213 indicates a printer driver corresponding to the DLL 150 described in the third embodiment; 214 indicates a color conversion engine performing a color matching process based on a monitor profile 215 and a printer profile 216; and 217 indicates a printer.

The drawing module 211 inputs a drawing command (print command) for an arbitrary object from the application 210 and also inputs drawing color information which indicates a color of the object to be drawn. The drawing module 211 adds a parameter (hereinafter referred to as a color conversion parameter) to the input drawing command, the parameter being produced in an initializing process and corresponding to a color matching method. The color conversion parameter added by the drawing module 211 is common to each object.

Figure 22:
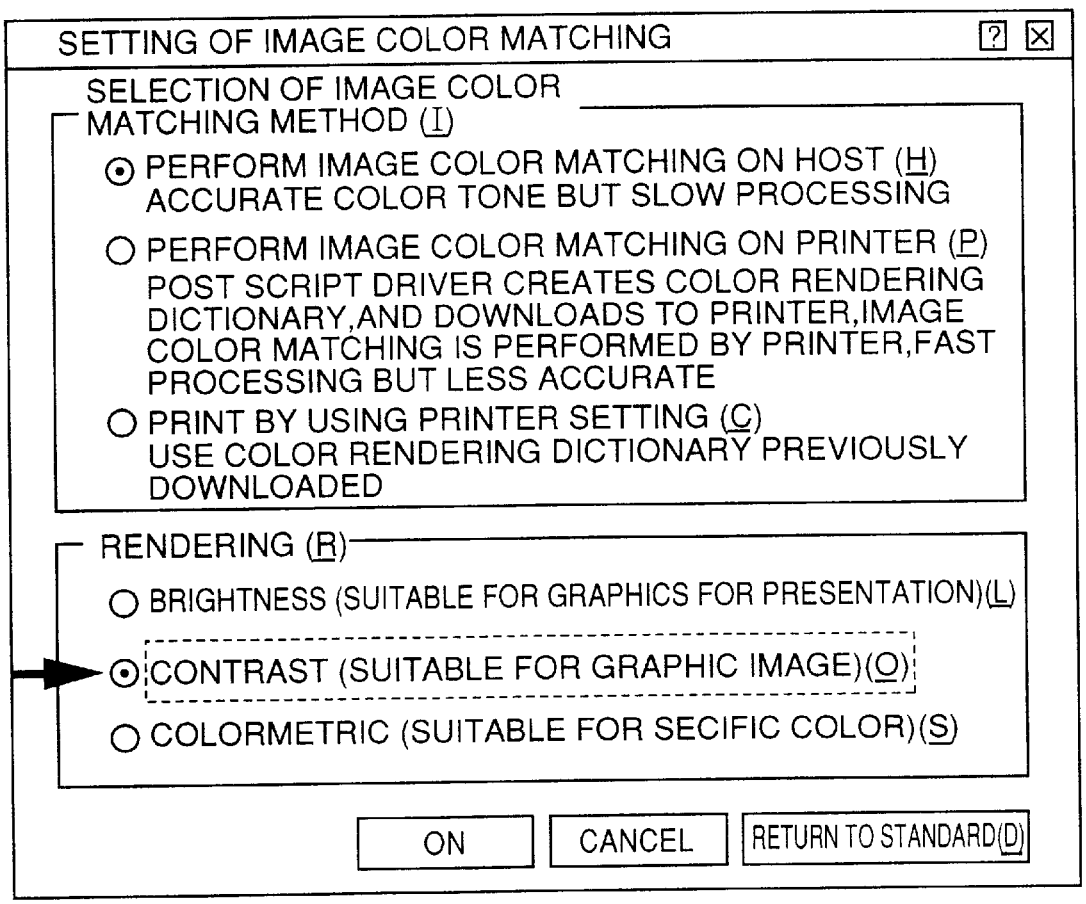
FIG. 22 is an illustration of a setting screen for designating a color matching method.

The expansion printer driver 212 is provided between the drawing module 211 and the printer driver 213, and is called by the drawing module 211. In the third embodiment, the expansion DLL 151 can be called by the upper order module 130 by setting the file name of FIG. 22 is an illustration of a setting screen for designating a color matching method. In FIG. 22, the color matching method is referred to as "rendering". By following instructions in the setting screens shown in FIG. 21 and FIG. 22, setting as to whether or not the color matching is applied and setting of the color matching method (color conversion parameter) to be used can be achieved. In the setting screens shown in FIGS. 21 and 22, a column for designating the object to be processed is not provided. This indicates that the conventional printer driver cannot set a color matching method for each object and a color matching is applied for an entire image on the screen. Accordingly, the present embodiment provides a color conversion processing system and method for achieving an appropriate color matching process for each object such as a character image and bit map image by expanding a printer driver which is capable of using a color matching method but cannot apply the color matching process on an object unit basis.

Figure 23:
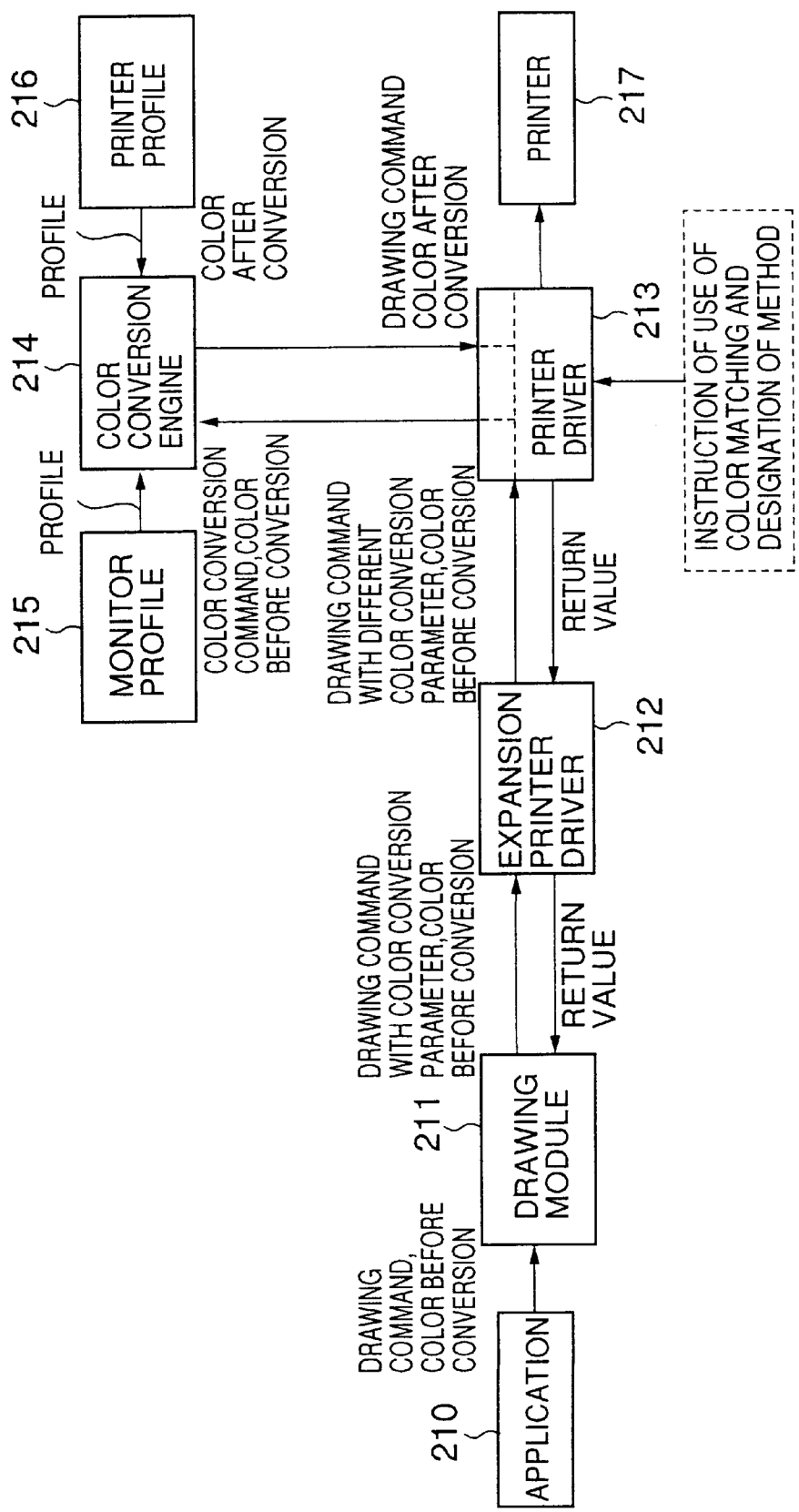
FIG. 23 is a block diagram of the color conversion processing system according to the fourth embodiment of the present invention.

FIG. 23 is a block diagram of a color conversion processing system according to the fourth embodiment of the present invention. In FIG. 23, a reference numeral 210 indicates an application; 211 indicates a drawing module corresponding to the upper the DLL 150 to the expansion DLL 151. However, when a printer driver is installed in a computer, it is normal that the name of a DLL file called by a drawing module can be designated. Accordingly, in the fourth embodiment, the expansion printer driver 212 can be called by the drawing module 211 by setting a name of the designated file to the file of the expansion printer driver 212.

The expansion printer driver 212 inputs a drawing command and drawing color information from the drawing module 211. Then, the expansion printer driver 212 discriminates a type of the drawing command input from the drawing module 211 so as to select one of a plurality of color conversion parameters which corresponds to the discriminated type of the drawing command. Thereafter, the expansion printer driver 212 replaces the color conversion parameter added to the drawing command with the selected color conversion parameter, and outputs the drawing command together with the drawing color information.

The printer driver 213 is capable of handling a color matching as mentioned above. That is, the printer driver 213 is capable of receiving the drawing command to which a color conversion parameter (an argument of the parameter) is added. As explained with reference to FIG. 21 and FIG. 22, a user can designate an application of a color matching and a color matching method (not for each individual object).

When a drawing command and drawing color information are input from the expansion printer driver 212, the printer driver 213 outputs the color conversion command including a color conversion parameter and the drawing color information to the color conversion engine 214. Then, the printer driver 213 converts the drawing command into the original drawing command which is peculiar to the printer 217. Thereafter, the printer driver 213 inputs drawing color information, which is processed according to the color matching, from the color conversion engine 214, and outputs the drawing command and drawing color information to the printer 217.

Additionally, the color conversion engine 214 inputs a color conversion command having the color conversion parameter and the drawing color information from the printer driver 213. Then, the color conversion engine 214 applies the color matching process to the drawing color information based on the monitor profile 215 which is color characteristic information of the input device and the printer profile 216 which is color characteristic information of the output device. It should be noted that the detail of the color matching process was described in the first embodiment, and a description thereof will be omitted.

In the color conversion processing system according to the above-mentioned fourth embodiment of the present invention, the expansion printer driver 212 corresponds to the "type discriminating means" and the "attribute information replacing means". Additionally, the printer driver 213 and the color conversion engine 214 correspond to the "color conversion means".

A description will now be given of the color conversion method used in the fourth embodiment.

(1) Driver Initialization Process

Figure 24:
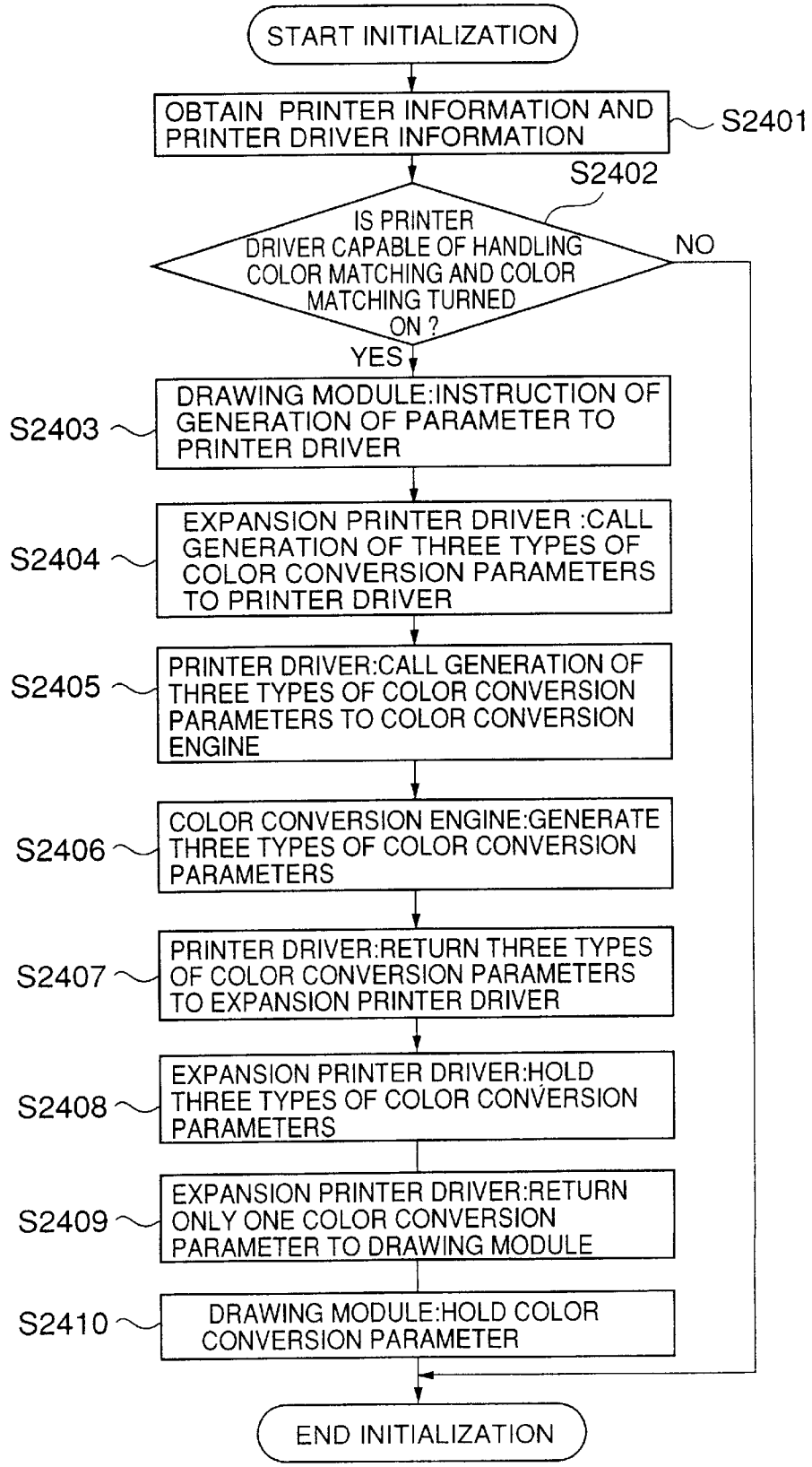
FIG. 24 is a flowchart of an operation for initializing the driver in the color conversion processing system according to the fourth embodiment of the present invention.

FIG. 24 is a flowchart of an operation for initializing the driver in the color conversion processing system according to the fourth embodiment.

In step S2401, the drawing module 211 obtains from the printer driver 213 the printer information and the driver information which include information as to whether or not a color matching is applicable. Specifically, the expansion printer driver 212 receives an inquiry from the drawing module 211, and then the expansion printer driver 212 transfers the received inquiry to the printer driver 213. Then, the expansion printer driver 212 receives a return value with respect to the printer information and the driver information from the printer driver 213, and transfers the return value to the drawing module 211. As a result, the drawing module 211 can obtain the printer information and the driver information from the printer driver 213.

In step S2402, the drawing module 211 determines whether or not the printer driver 213 is capable of handling the color matching and whether use of the color matching is instructed based on the obtained printer information and the driver information. In the present embodiment, the printer driver 213 is capable of handling the color matching, and use of the color matching is set through the setting screens shown in FIG. 21 and FIG. 22.

If it is determined, in step S2402, that the printer driver 213 is not capable of handling the color matching, or the printer driver 213 is capable of handling the color matching but the instruction of use of the color matching is not provided, the initializing process is ended.

On the other hand, if it is determined, in step S2402, that the printer driver 213 is capable of handling the color matching and the instruction of use of the color matching is provided, the drawing module 211 issues, in step S2403, a color conversion parameter generating command to the printer driver 213.

After the expansion printer driver 212 inputs the color conversion parameter generating command from the drawing module 211, the expansion printer driver 212 sends, in step S2404, the color conversion parameter generating command which provides an instruction to generate color conversion parameters corresponding to three types of objects including a bit map image, a character image and a graphic image. The reason for providing the color conversion parameters corresponding to three types of objects is that a designation of the drawing command used in the conventional computer circumstance is different from the bit map image, the character image and the graphic image. The bit map image described herein corresponds to the "graphics for presentation" in the rendering column shown in FIG. 22, and also the graphic image corresponds to the "graphic image" in the rendering column shown in FIG. 22.

In step S2405, the printer driver 213 inputs the color conversion parameter generating command from the expansion printer driver 213, and outputs the input color conversion parameter generating command to the color conversion engine 214.

In step S2406, the color conversion engine 214 inputs the color conversion parameter generating command from the printer driver 213, and generates the color conversion parameter for a bit map image, the color conversion parameter for the character image and the color conversion parameter for the graphic image. The generated parameters of the three types are output to the printer driver 213.

In step S2407, the printer driver 213 inputs the color conversion parameters of the three types from the color conversion engine 214, and outputs them to the expansion printer driver 212.

Thereafter, in step S2408, the expansion printer driver 213 holds the color conversion parameters of the three types, and outputs, in step S2409, one of the color conversion parameters to the drawing module 211. This is because a drawing module in the conventional computer circumstance is capable of designating only one color matching method, that is, different color matching methods cannot be designated for each object. It should be noted that one of the color conversion parameters to be output can be determined by an operation performed through the setting screens shown in FIGS. 21 and 22.

In step S2410, the drawing module 211 holds the one of the color conversion parameters input from the expansion printer driver 212, and the routine is ended. When the drawing command is output, the drawing module 211 adds the color conversion parameter held therein to the drawing command.

It should be noted that although it is explained in the above description that the color conversion parameters of the three types are generated concurrently, the output of the color conversion command and the generation of the color conversion parameter are performed for each type of object. That is, when the color conversion parameter is generated for each of the three types of objects, the processes of steps S2404 to S2408 shown in FIG. 24 are repeated three times.

As mentioned above, in the fourth embodiment, the expansion printer driver 212 uses a method for expanding the dynamic linking program module described in the third embodiment. Thus, the function of the printer driver 213 can be expanded so that the three types of color conversion parameters can be generated, whereas only one color conversion parameter can be generated for one color conversion parameter generating command in the conventional method.

(2) Drawing Command Issuing Process by Expansion Printer Driver

Figure 25:
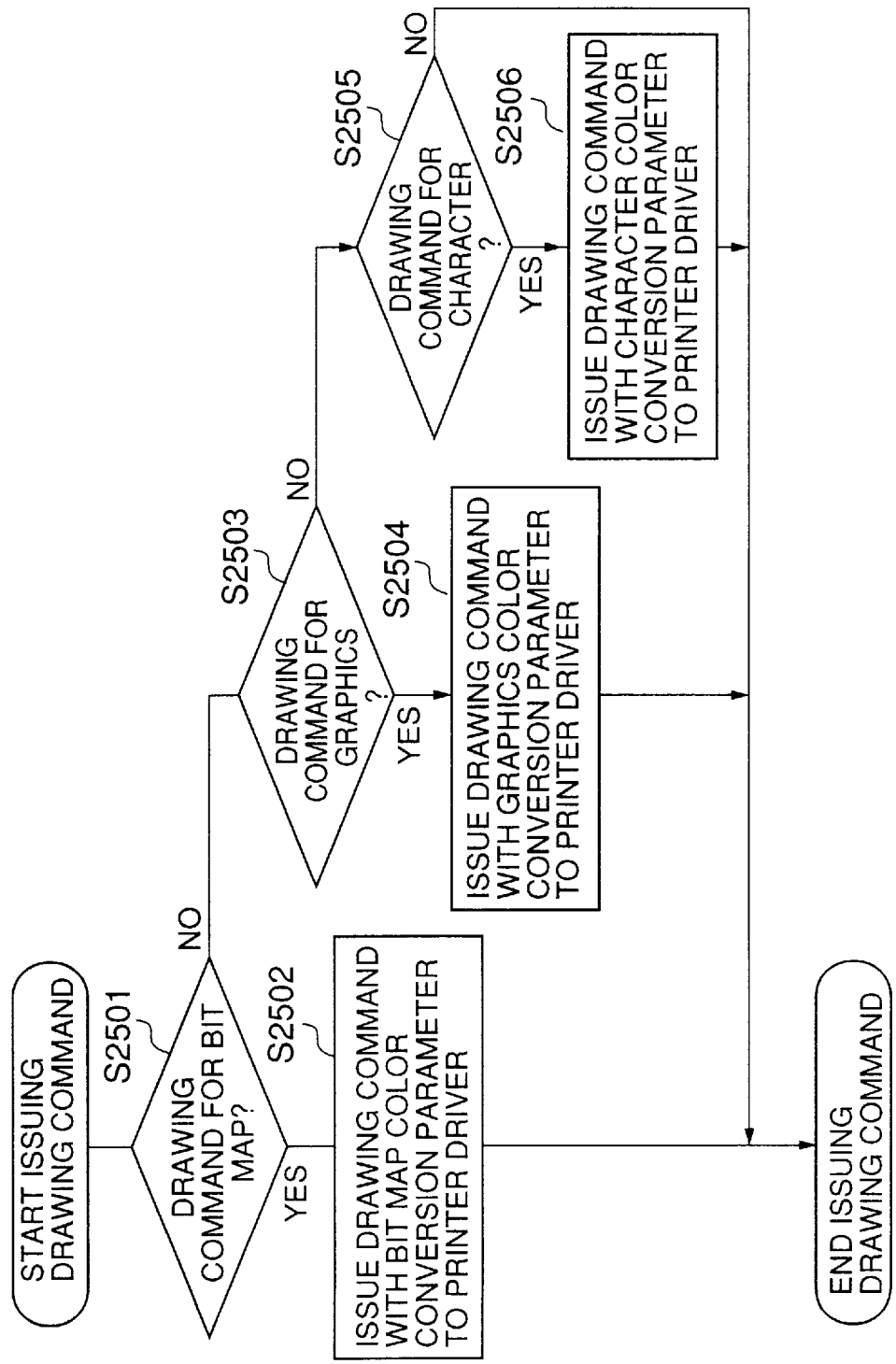
FIG. 25 is a flowchart of a procedure for issuing a drawing command by an expansion printer driver in the color conversion processing system according to the fourth embodiment of the present invention.

A description will now be given of a process for issuing a drawing command by the expansion printer driver 212. FIG. 25 is a flowchart of a procedure for issuing the drawing command by the expansion printer driver 212 in the color conversion processing system according to the fourth embodiment of the present invention.

The drawing module 211 inputs the drawing command (print command) and the drawing color information from the application 210, and then outputs the drawing command and the drawing color information by adding the color conversion parameter generated in the initializing process to the drawing command. The expansion printer driver 212 discriminates the type of the object corresponding to the input drawing command. The discrimination of the type of the object is performed in the processes of steps S2501, S2503 and S2505.

A description will now be given of the discriminating process of the type of the object. The expansion printer driver 212 determines whether the object to be drawn corresponds one of a bit map image, a graphic image and a character (text) image. The reason for the classification of the three types is that a designation of the drawing command used in the conventional computer circumstance differs from the bit map image, the graphic image and the text image.

Generally, a series of commands, which include the drawing command issued from the drawing module to the printer driver, provide device driver interface (DDI) functions. The DDI functions can be classified as shown in FIG. 26 according to a nature of their function. The DDI functions are exported to the expansion printer driver 212. A type of object can be discriminated by detecting a DDI function corresponding to the type of object to be drawn. That is, the type of object can be discriminated by determining whether the DDI functions includes drawing of the bit map image, drawing of the graphic image or drawing of the text image. In order to determine the type of object, the designation of the drawing command is used. After the discrimination of the type of object, one of the color conversion parameters generated in the initializing process is added to the drawing command so that the color matching process on the object unit basis can be performed by the printer driver 213 and the color conversion engine 214.

Returning to the description of FIG. 25, in step S2501, the expansion printer driver 212 determines whether or not the input drawing command corresponds to the bit map image. If it is determined, in step S2501, that the drawing image corresponds to the bit map image, the routine proceeds to step S2502. In step S2502, the expansion printer driver 212 selects the color conversion parameter corresponding to the bit map image from among the three types of color conversion parameters generated in the initializing process. The expansion printer driver 212 replaces the color conversion parameter added by the drawing module 211 with the selected color conversion parameter so as to generated the drawing command with the color conversion parameter for the bit map image. The thus-produced color conversion command is output to the printer driver 213 together with the drawing color information, and the routine is ended.

On the other hand, if it is determined, in step S2501, that the input drawing command does not correspond to the bit map image, the routine proceeds to step S2503. Then, it is determined, in step S2503, whether or not the input drawing command corresponds to the graphic image.

If it is determined, in step S2503, that the drawing image corresponds to the graphic image, the routine proceeds to step S2504. In step S2504, the expansion printer driver 212 selects the color conversion parameter corresponding to the graphic image from among the three types of color conversion parameters generated in the initializing process. The expansion printer driver 212 replaces the color conversion parameter added by the drawing module 211 with the selected color conversion parameter so as to generated the drawing command with the color conversion parameter for the graphic image. The thus-produced color conversion command is output to the printer driver 213 together with the drawing color information, and the routine is ended.

On the other hand, if it is determined, in step S2503, that the input drawing command does not correspond to the graphic image, the routine proceeds to step S2505. Then, it is determined, in step S2505, whether or not the input drawing command corresponds to the character image.

If it is determined, in step S2505, that the drawing image corresponds to the character image, the routine proceeds to step S2506. In step S2506, the expansion printer driver 212 selects the color conversion parameter corresponding to the character image from among the three types of color conversion parameters generated in the initializing process. The expansion printer driver 212 replaces the color conversion parameter added by the drawing module 211 with the selected color conversion parameter so as to generated the drawing command with the color conversion parameter for the character image. The thus-produced color conversion command is output to the printer driver 213 together with the drawing color information, and the routine is ended.

On the other hand, if it is determined, in step S2505, that the input drawing command does not correspond to the character image, the expansion printer driver 212 outputs the drawing command to the printer driver 213 without changing the argument thereof, and the routine is ended. That is, the expansion printer driver 212 is compatible with the printer driver except for the discrimination of the type of the object and the replacement of the color conversion parameter.

Thereafter, the printer driver 213 inputs the drawing command and the drawing color information from the expansion printer driver 212, and outputs the color conversion command to the color conversion engine 214 after adding the color conversion parameter added to the drawing command to the color conversion command. The color conversion engine 214 applies the color matching process to the drawing color information based on the color conversion parameter added to the color conversion command, and outputs the thus-processed drawing color information to the printer driver 213. The printer driver 213 converts the input drawing command into the Additionally, although the expansion printer driver 212 determines whether the drawing command corresponds to one of the bit map image, the graphic image and the character image, the number of types of the objects is not limited to three, and the number of types may be increased or one of the types may be classified in a plurality of sub-types.

(First Variation)

A description will now be given of a first variation of the fourth embodiment.

The above-mentioned expansion printer driver 212 determines whether the drawing command corresponds to one of the bit map image, the graphic image and the character image so as to replace the color conversion parameter attached to the drawing command with the color conversion parameter corresponding to the type of the object to be drawn. However, a specific object such as a character in a graphic image used for a presentation tool may require a color which attracts attention rather than a color close to a color on the monitor screen. Generally, when a color conversion is not performed, an image output from a printer is printed with colors brighter than the colors of an image displayed on a monitor screen. Accordingly, in the first variation, if it is determined that the drawing command corresponds to drawing command which can be handled by the printer 217. Additionally, the printer driver 213 inputs the drawing color information from the color conversion engine 214, and outputs the drawing information to the printer 217 together with the converted drawing command.

As mentioned above, in the color conversion processing system according to the fourth embodiment of the present invention, the expansion printer driver 212 is provided for adding the color conversion parameter corresponding to a type of object to be drawn to the drawing command. Thus, an appropriate color matching process can be performed in response to the type of object to be drawn by providing only the expansion printer driver 212 expanding the function of the printer driver 213 which is capable of handling the color matching but not capable of discriminating a type of each object.

It should be noted that, in the fourth embodiment, the color conversion parameters of the three types held by the expansion printer driver 212 are generated in the initializing process. However, the color conversion parameters may be generated based on a result of discrimination after the drawing command is issued and the type of object corresponding to the issued drawing command is discriminated. a character image, the color conversion parameter originally attached to the drawing command is not replaced with a new color conversion parameter but the originally attached color conversion parameter is eliminated so that the color matching is not performed for the character image.

Figure 27:
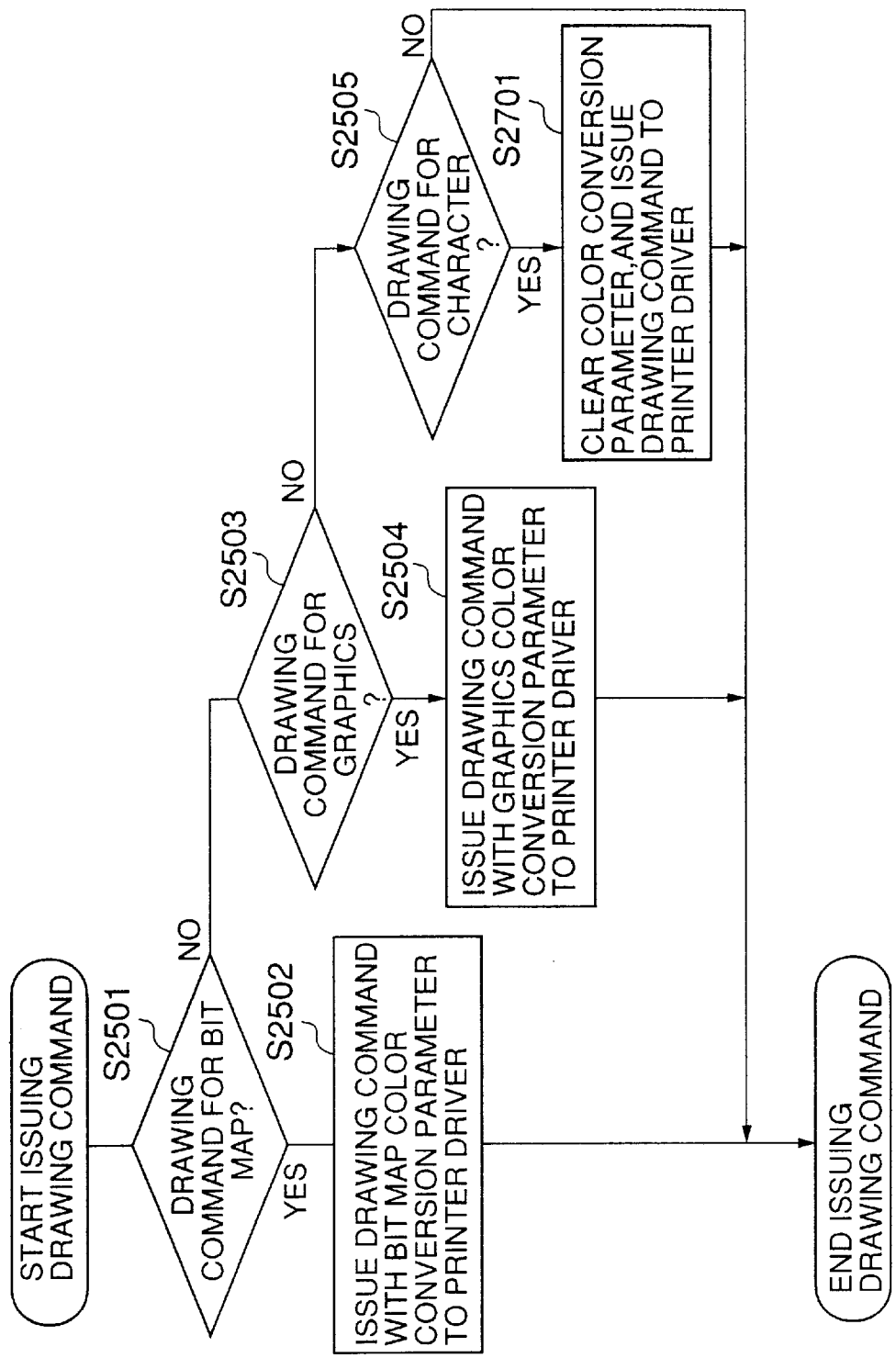
FIG. 27 is a flowchart of a procedure of an operation according to a first variation of the fourth embodiment.

FIG. 27 is a flowchart of a procedure of an operation according to the first variation. In FIG. 27, steps that are the same as the steps shown in FIG. 25 are given the same step numbers, and descriptions thereof will be omitted.

The process for eliminating the color conversion parameter is performed in step S2701. As a result, a drawing command which does not includes the color conversion parameter is output from the expansion printer driver 212 to the printer driver 213. Thus, the drawing color information is not subjected to the color matching process, and is output to the printer 217 through the printer driver 213 without change. It should be noted that the process for eliminating the color conversion parameter can be performed when the type of the object to be drawn is discriminated.

(Second Variation)

A description will now be given of a second variation of the fourth embodiment of the present invention. Similar to the first variation, the second variation is related to an elimination of the color conversion parameter in a particular case.

A primary color or a color similar to a primary color such as cyan, magenta, yellow, black, red, green, blue, or white has a tendency to provide an increased color matching error to a viewer. Hereinafter, these colors may be referred to as specific colors. Accordingly, there may be a case in which a color matching is not preferable to avoid the color matching error. In the second variation, when a color of a character image is one of the above-mentioned specific colors, the color matching process is not performed for the drawing color information of such a character image. However, in order to prevent a problem arisen from a case in which a color matching is not performed in a part of a gradation area, it is preferred to eliminate the color matching process only in a case in which the above-mentioned colors are used for a character image which is barely subjected to a gradation.

Figure 28:
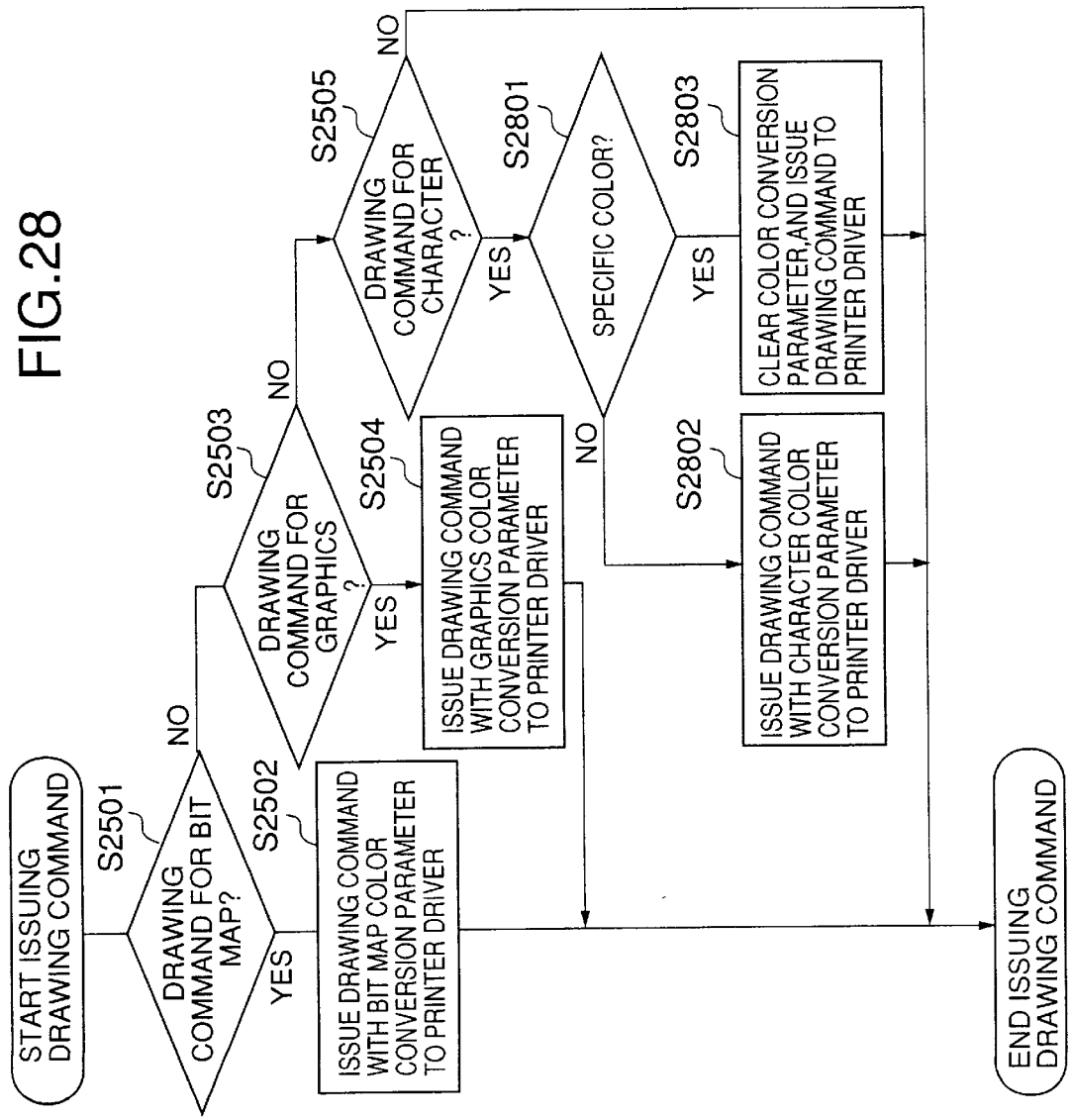
FIG. 28 is a flowchart of a procedure of an operation according to a second variation of the fourth embodiment.

FIG. 28 is a flowchart of a procedure of an operation according to the second variation of the fourth embodiment. In FIG. 28, steps that are the same as the steps shown in FIG. 25 are given the same step numbers, and descriptions thereof will be omitted.

When the expansion printer driver 212 determines, in step S2505, that the drawing command corresponds to the character image, the routine proceeds to step S2801. In step S2801, it is determined whether or not a color of the character image is one of the above-mentioned specific colors. If it is determined that the character image is not one of the specific colors, the routine proceeds to step S2802. In step S2802, the color conversion parameter attached to the drawing command is replaced with the color conversion parameter for the character image. On the other hand, if it is determined, in step S2802, that the color of the character image is one of the specific colors, the routine proceeds to step S2803. In step S2803, the color conversion parameter attached to the drawing command is eliminated. As a result, a drawing command which does not include the color conversion parameter is output from the expansion printer driver 212 to the printer driver 213. Thus, the drawing color information is not subjected to the color matching process, and is output to the printer 217 through the printer driver 213 without change.

Fifth Embodiment

A description will now be given of a color conversion processing system according to a fifth embodiment of the present invention. The color conversion processing system according to the fifth embodiment of the present invention is achieved by applying a method for expanding the dynamic linking program module according to the third embodiment of the present invention. That is, a color matching is achieved by expanding the function of the printer driver which is not capable of handling a color matching.

When the printer driver is capable of handling a color matching, one of the color conversion engines can be called as described in the fourth embodiment. However, when the printer driver is not capable of handling a color matching, the color conversion engine cannot call. As a result, a color matching cannot be performed. Accordingly, in the fifth embodiment of the present invention, an expansion printer driver which is capable of calling a color conversion engine is added to a printer driver which is not capable of handling a color matching so that the color matching process can be performed by the printer which is not originally capable of handling a color matching.

Figure 29:
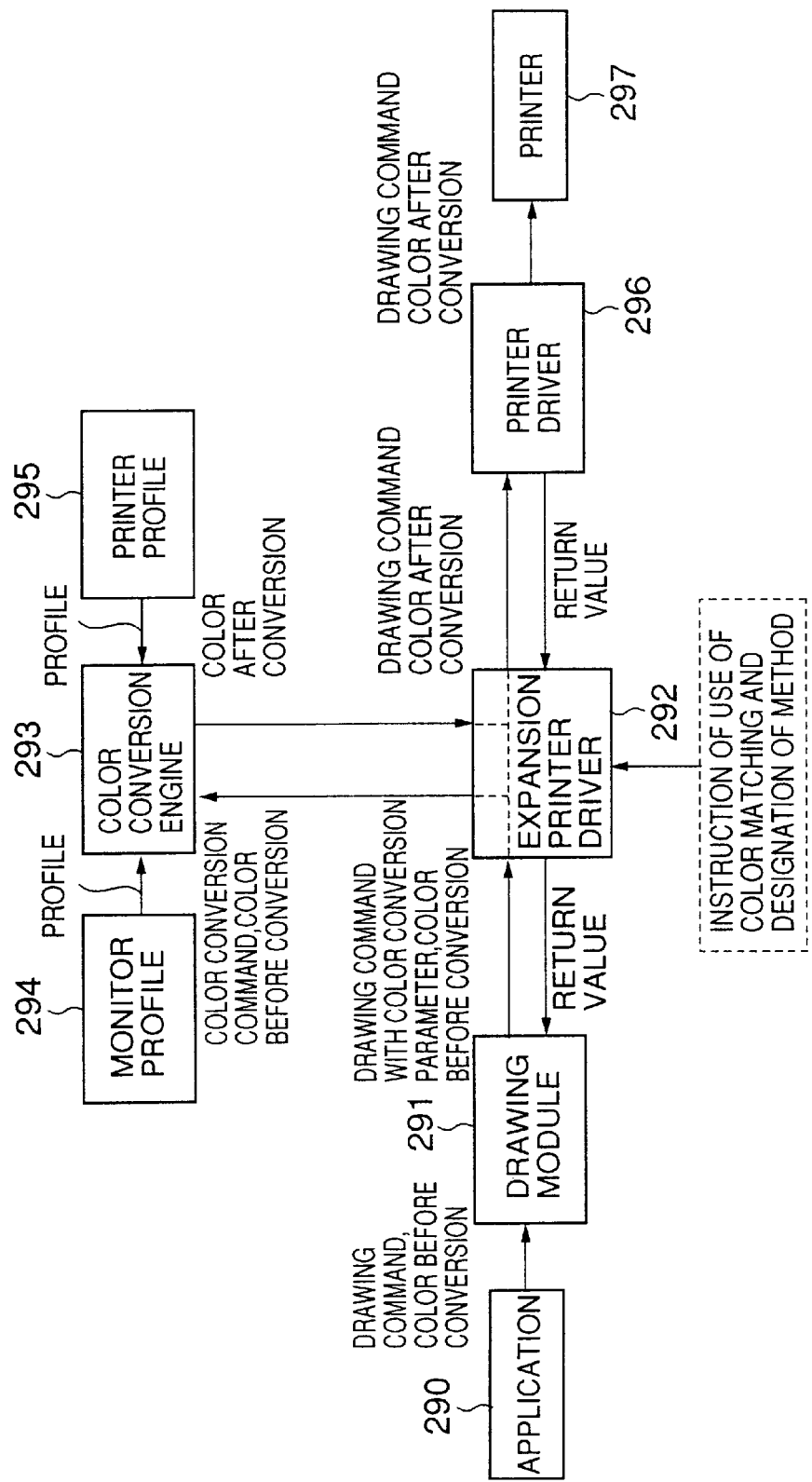
FIG. 29 is a block diagram of a color conversion processing system according to a fifth embodiment of the present invention.

FIG. 29 is a block diagram of the color conversion processing system according to the fifth embodiment of the present invention. In FIG. 29, a reference numeral 290 indicates an application; 291 indicates a drawing module corresponding to the upper order module 130 described in the third embodiment; 292 indicates an expansion printer driver similar to the expansion DLLs 151, 170 and 190 described in the third embodiment; 293 indicates a color conversion engine performing a color matching process based on a monitor profile 294 and a printer profile 295; 296 indicates a printer driver corresponding to the DLL 150 described in the third embodiment; and 297 indicates a printer.

The drawing module 291 inputs a drawing command (print command) and drawing color information from the application 290. Then, the drawing module 291 adds a color conversion parameter corresponding to the color matching method generated in an initializing process to the input drawing command. The drawing command and the drawing color information are output to the expansion printer driver 292.

The expansion printer driver 292 is provided between the drawing module 291 and the printer driver 296, and is called by the drawing module 291. The expansion printer driver 292 inputs a drawing command and drawing color information from the drawing module 291. Then, the expansion printer driver 292 discriminates a type of the drawing command input from the drawing module 291 so as to select one of a plurality of color conversion parameters which corresponds to the discriminated type of the drawing command. Thereafter, the expansion printer driver 292 replaces the color conversion parameter added to the drawing command with the selected color conversion parameter, and outputs the drawing command together with the drawing color information to the color conversion engine 293. Thereafter, the expansion printer driver 292 inputs the drawing color information which was subjected to the color matching process from the color conversion engine 293, and outputs the drawing command and the drawing color information to the printer driver 296.

Additionally, the color conversion engine 293 inputs the color conversion command attached with the color conversion parameter and the drawing color information from the expansion printer driver 292. The color conversion engine 293 applies the color matching process to the drawing color information based on the monitor profile 294 which is color characteristic information of an input device and the printer profile 295 which is color characteristic of an output device. The color matching process performed in the present embodiment is the same as that of the above-mentioned first embodiment, and description thereof will be omitted.

As mentioned above, the printer driver 296 is not capable of handling a color matching. The printer driver 296 inputs the drawing command and drawing color information from the expansion printer driver 292 which was subjected to the color matching process. Then, the printer driver 296 converts the drawing command into an original drawing command which is peculiar to the printer 297, and outputs the original drawing command to the printer 297 together with the drawing color information.

It should be noted that since the printer driver 296 is not capable of handling the color matching, the printer driver 296 does not provide setting screens as shown in FIGS. 21 and 22 which are described in the fourth embodiment. Accordingly, in the present embodiment, the setting screens are provided by the expansion printer driver 292 so that a user can designate use of a color matching and a color matching method through the expansion printer driver 292.

In the color conversion processing system according to the fourth embodiment, the expansion printer driver 292 corresponds to the "type discriminating means", the "selecting means" and the "output means"; the color conversion engine 293 corresponds to the "color conversion means"; and the printer driver 296 corresponds to the "drawing command conversion means".

A description will now be given of the color conversion method used in the fifth embodiment.

Figure 30:
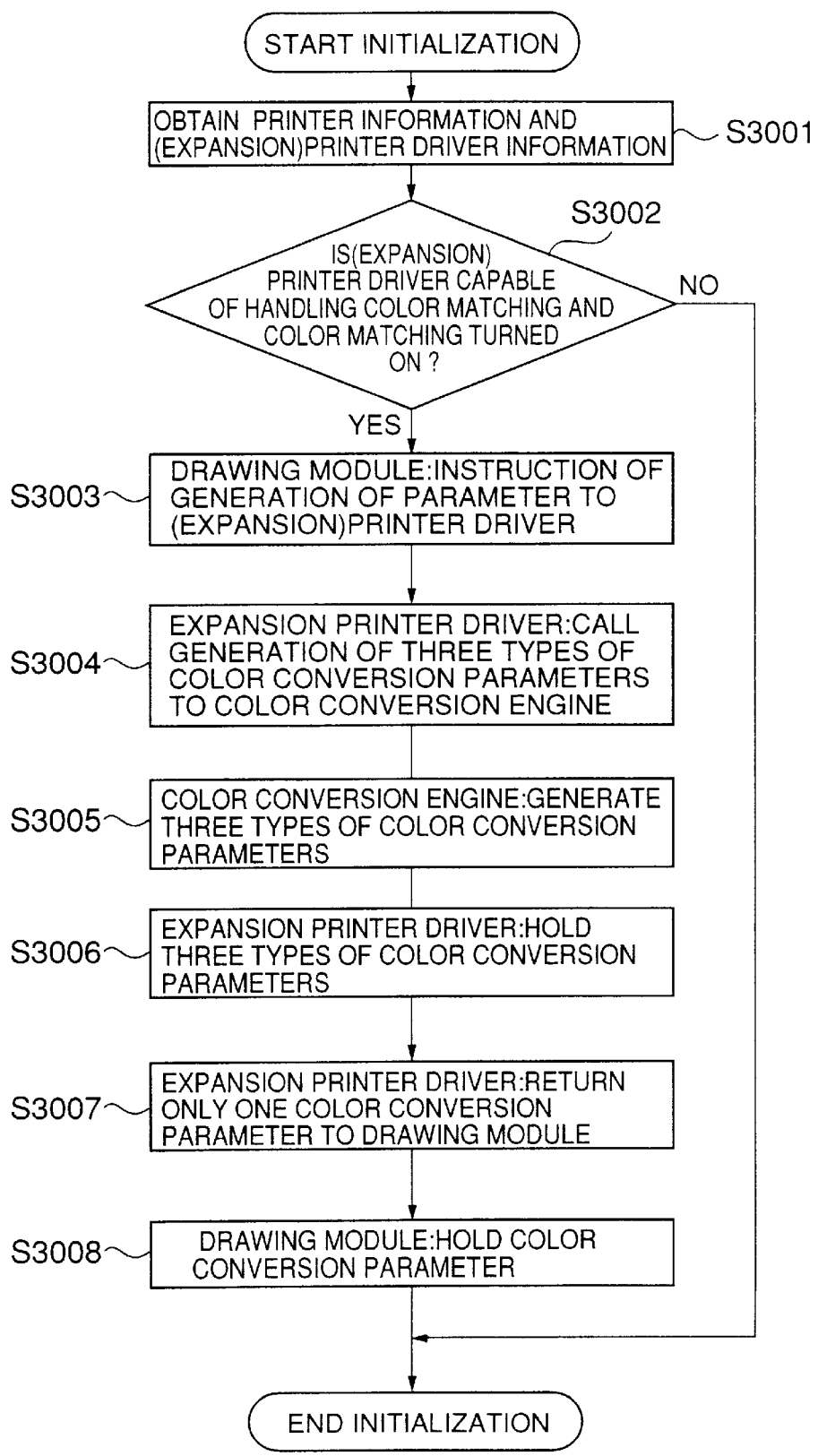
FIG. 30 is a flowchart of an operation for initializing a driver in the color conversion processing system according to the fifth embodiment of the present invention.

(1) Driver initialization process:

FIG. 30 is a flowchart of an operation for initializing the driver in the color conversion processing system according to the fifth embodiment.

In step S3001, the drawing module 291 obtains from the printer driver 296 the printer information and the driver information. Specifically, the expansion printer driver 292 receives an inquiry from the drawing module 291, and then the expansion printer driver 292 transfers the received inquiry to the printer driver 296. Then, the expansion printer driver 292 receives a return value with respect to the printer information and the driver information from the printer driver 296, and transfers the return value to the drawing module 291 after adding information with respect to the color matching to the return value. As a result, it seems to the drawing module 291 as if the printer driver 296 is capable of handling the color matching.

In step S3002, the drawing module 291 determines whether or not the printer driver 296 is capable of handling the color matching and whether use of the color matching is instructed based on the obtained printer information and the driver information. In the present embodiment, the printer driver 296 is not capable of handling the color matching but the expansion printer driver 292 is capable of handling the color matching. The use of the color matching is designated by a user through the setting screens similar to the screens shown in FIGS. 21 and 22 which are provided by the expansion printer driver 292.

If it is determined, in step S3002, that the printer driver 296 is not capable of handling the color matching, or the printer driver 296 is capable of handling the color matching but the instruction of use of the color matching is not provided, the initializing process is ended.

On the other hand, if it is determined, in step S3002, that the printer driver 296 is capable of handling the color matching and the instruction of use of the color matching is provided, the drawing module 291 issues, in step S3003, a color conversion parameter generating command to the printer driver 296.

The expansion printer driver 292 is capable of handling the color matching, that is, the expansion printer driver 292 has an argument with respect to the color conversion parameter and exports the color conversion command. Accordingly, after the expansion printer driver 292 inputs the color conversion parameter generating command from the drawing module 291, the expansion printer driver 292 sends to the color conversion engine 293, in step S3004, the color conversion parameter generating command which instructs generation of color conversion parameters corresponding to each of the three types of objects based on a previously set condition. The three types of objects are the bit map image, the graphic image and the character image as described in the fourth embodiment.

In step S3005, the color conversion engine 293 inputs from the expansion printer driver 292 the color conversion parameter generating command instructing generation of the color conversion parameters for the three types of objects. Thus, the color conversion engine 293 generates the color conversion parameter for a bit map image, the color conversion parameter for the character image and the color conversion parameter for the graphic image. The generated parameters of the three types are output to the expansion printer driver 292.

In step S3006, the expansion printer driver 292 inputs the color conversion parameters of the three types from the color conversion engine 293, and holds the parameters therein. Then, in step S3007, the expansion printer driver 292 outputs one of the color conversion parameters to the drawing module 291.

Thereafter, in step S3008, the drawing module 291 inputs and holds the one of the color conversion parameters input from the expansion printer driver 292, and the routine is ended. When the drawing command is output, the drawing module 291 adds the color conversion parameter held therein to the drawing command.

It should be noted that although it is explained that the color conversion parameters of the three types are generated concurrently in the above description, the output of the color conversion command and the generation of the color conversion parameter are performed for each type of object in different processes. That is, when the color conversion parameter is generated for each of the three types of objects, the processes of steps S3004 to S3006 shown in FIG. 30 are repeated three times.

Figure 31:
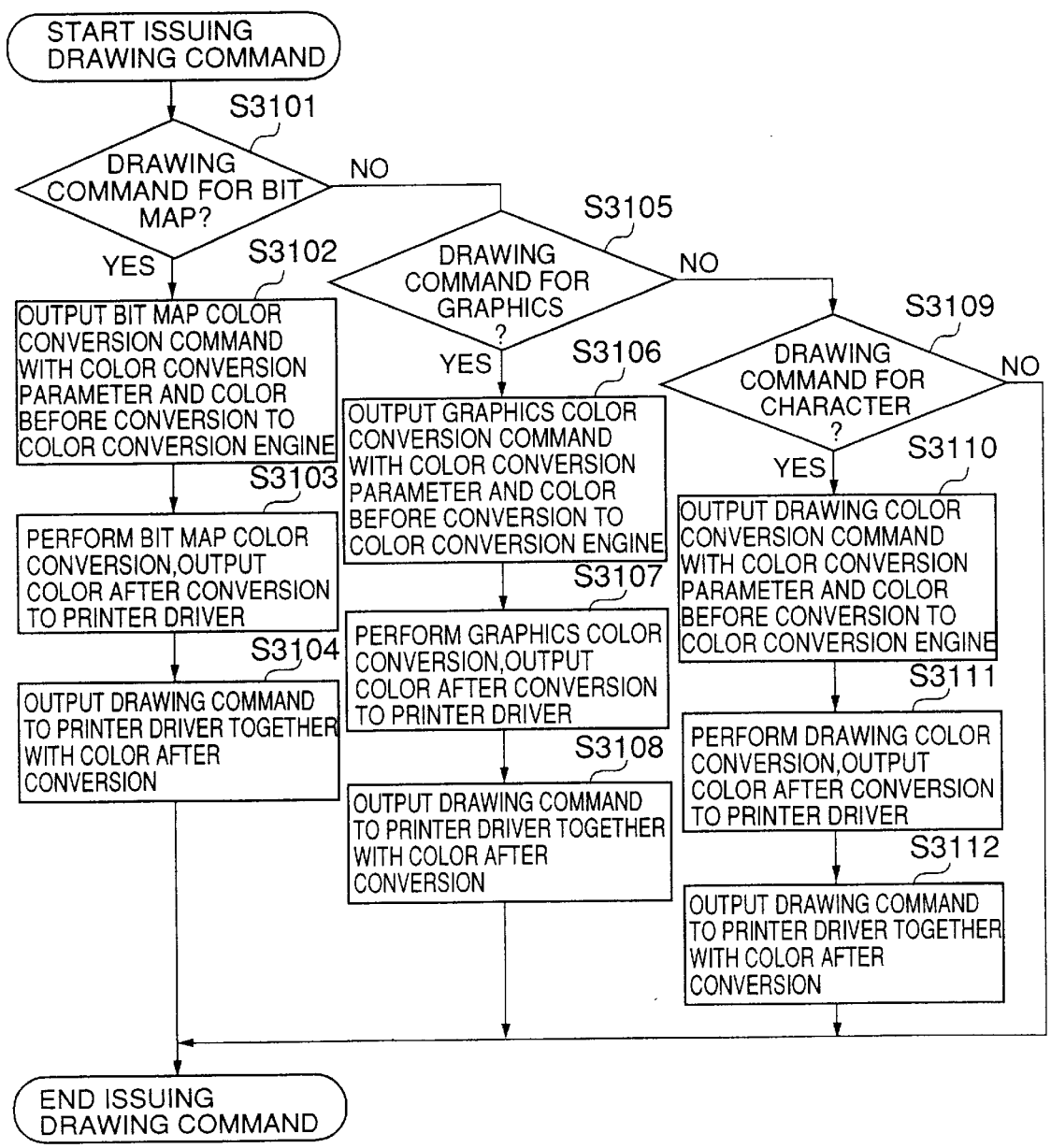
FIG. 31 is a flowchart of a procedure for discriminating a type of object, a procedure for converting color and a procedure for issuing the drawing command in the color conversion processing system according to the fifth embodiment of the present invention.

(2) Discriminating Process for Type of Object, Color Conversion Process and Drawing Command Issuing Process:

A description will now be given of a process for discriminating a type of object, a process for color conversion and a process for issuing a drawing command. FIG. 31 is a flowchart of a procedure for discriminating a type of object, a procedure for converting color and a procedure for issuing the drawing command in the color conversion processing system according to the fifth embodiment of the present invention.

The drawing module 291 inputs the drawing command (print command) and the drawing color information from the application 290, and then outputs the drawing command and the drawing color information by adding the color conversion parameter generated in the initializing process to the drawing command. The expansion printer driver 292 can discriminate the type of the object corresponding to the input drawing command as described in the fifth embodiment. Thus, when the expansion printer driver 292 receives the drawing command and the drawing color command from the drawing module 291, the expansion printer driver 292 discriminates the type of the object in steps S3101, S3105 and S3109.

In step S3101, the expansion printer driver 292 inputs the drawing command and the drawing color information from the drawing module 291, and determines whether or not the input drawing command corresponds to a bit map image based on the designation of the drawing command. If it is determined, in step S3101, that the drawing image corresponds to the bit map image, the routine proceeds to step S3102. In step S3102, the expansion printer driver 292 selects the color conversion parameter corresponding to the bit map image from among the three types of color conversion parameters generated in the initializing process. Then, the expansion printer driver 292 outputs the drawing command attached with the selected color conversion parameter and the drawing color information to the color conversion engine 293.

In step S3103, the color conversion engine 293 inputs the color conversion command and the drawing color information from the expansion printer driver 292, and applies the color matching process to the drawing color information based on the color conversion parameter for the bit map image which is attached to the input color conversion command. Then, the color conversion engine 293 outputs the drawing color information which was subjected to the color matching process to the expansion printer driver 292.

In step S3104, the expansion printer driver 292 inputs the drawing color information which was subjected to the color matching process from the color conversion engine 293, and outputs the drawing command and the drawing information to the printer driver 296, and the routine is ended. It should be noted that the drawing command which is attached with the color conversion parameter is restructured to a new drawing command so that the new drawing command can be output to the printer driver 296 which is not capable of handling the color matching.

On the other hand, if it is determined, in step S3101, that the input drawing command does not correspond to the bit map image, the routine proceeds to step S3105. Then, the expansion printer driver 292 determines, in step S3105, whether or not the input drawing command corresponds to a graphic image.

If it is determined, in step S3105, that the drawing image. corresponds to the graphic image, the routine proceeds to step S3106. In step S3106, the expansion printer driver 292 selects the color conversion parameter corresponding to the graphic image from among the three types of color conversion parameters generated in the initializing process. Then, the expansion printer driver 292 outputs the drawing command attached with the selected color conversion parameter and the drawing color information to the color conversion engine 293.

In step S3107, the color conversion engine 293 inputs the color conversion command and the drawing color information from the expansion printer driver 292, and applies the color matching process to the drawing color information based on the color conversion parameter for the graphic image which is attached to the input color conversion command. Then, the color conversion engine 293 outputs the drawing color information which was subjected to the color matching process to the expansion printer driver 292.

In step S3108, the expansion printer driver 292 inputs the drawing color information which was subjected to the color matching process from the color conversion engine 293, and outputs the drawing command and the drawing information to the printer driver 296, and the routine is ended.

On the other hand, if it is determined, in step S3105, that the input drawing command does not correspond to the graphic image, the routine proceeds to step S3109. Then, the expansion printer driver 292 determines, in step S3109, whether or not the input drawing command corresponds to a character image.

If it is determined, in step S3109, that the drawing image corresponds to the character image, the routine proceeds to step S3110. In step S3110, the expansion printer driver 292 selects the color conversion parameter corresponding to the character image from among the three types of color conversion parameters generated in the initializing process. Then, the expansion printer driver 292 outputs the drawing command attached with the selected color conversion parameter and the drawing color information to the color conversion engine 293.

In step S3111, the color conversion engine 293 inputs the color conversion command and the drawing color information from the expansion printer driver 292, and applies the color matching process to the drawing color information based on the color conversion parameter for the character image which is attached to the input color conversion command. Then, the color conversion engine 293 outputs the drawing color information which was subjected to the color matching process to the expansion printer driver 292.

In step S3112, the expansion printer driver 292 inputs the drawing color information which was subjected to the color matching process from the color conversion engine 293, and outputs the drawing command and the drawing information to the printer driver 296, and the routine is ended.

On the other hand, if it is determined, in step S3109, that the input drawing command does not correspond to the character image, the expansion printer driver 292 outputs the drawing command to the printer driver 296 without changing the argument thereof, and the routine is ended.

Thereafter, the printer driver 296 inputs the drawing command and the drawing color information from the expansion printer driver 292, and outputs the color conversion command to the printer 297 after converting the drawing command into an original drawing command peculiar to the printer 297. That is, the expansion printer driver 296 receives the drawing command and the expansion color information after being subjected to the color matching process so as to perform a regular process irrespective of the presence of the expansion printer driver 292.

As mentioned above, in the color conversion processing system according to the fifth embodiment of the present invention, the expansion printer driver 292 is capable of handling the color matching and is capable of discriminating a type of object. Thus, an appropriate color matching process can be performed in response to the type of object to be drawn by providing only the expansion printer driver 292 expanding the function of the printer driver 296 which is not capable of handling the color matching.

It should be noted that, in the fifth embodiment, the color conversion parameters of the three types held by the expansion printer driver 292 are generated in the initializing process. However, the color conversion parameters may be generated based on a result of discrimination after the drawing command is issued and the type of object corresponding to the issued drawing command is discriminated.

Additionally, although the expansion printer driver 292 determines whether the drawing command corresponds to one of the bit map image, the graphic image and the character image, the number of types of the objects is not limited to three, and the number of types may be increased or one of the types may be further classified in a plurality of sub-types.

Further, variations similar to the first and second variations of the fourth embodiment may be achieved for the fifth embodiment.

FIG. 32 is a system structure diagram of hardware which achieves the color conversion processing system according to the above-mentioned first to fifth embodiments. In FIG. 32, the color conversion processing system comprises a CPU 101, a ROM 102, a RAM 103, a hard disc drive unit 104, a floppy disc drive unit 105, an operational unit 106 such as a keyboard, a CD-ROM drive unit 107, a communication unit 108, a network expansion board 109, a printer 110 and a display unit 111. These units are interconnected by a bus line 112. The color image to be subjected to the color matching process is displayed on the display unit 111 such as a color monitor display, and is printed by the printer 110.

The color conversion processing system according to the first to fifth embodiments is achieved by software programs which are stored in the hard disc drive unit 104. The programs are read by the CPU 101 and temporarily stored in the RAM 103 when the color conversion processing system is operated. Additionally, the software program may be provided as program data recorded on a floppy disc which is read by the floppy disk drive unit 105, or recorded on a CD-ROM which is read by the CD-ROM drive unit 107.

That is, the color conversion processing method, the expanding method for a dynamic linking program module and the color conversion processing method using the expanding method can be interpreted as computer readable programs, and the programs may be recorded on a computer readable recording medium such as a floppy disc, a hard disc, a CD-ROM or a DVD. The CPU 101 read the programs by using the floppy disc drive unit 105 or the CD-ROM drive unit so as to perform the above-mentioned process according to the present invention. Additionally, the CPU 101 can receive the programs via the communication unit 108 or the network expansion board 109.

The present invention is not limited to the specifically disclosed embodiments, and variations and modifications may be made without departing form the scope of the present invention.

What is claimed is:

1. A color conversion method for converting first color image information into second color image information output to a color image outputting apparatus, said color conversion method comprising the steps of:
   inputting the first color image information including at least one object to be drawn;
   "determining" automatically whether or not the first color image information includes attribute information of a color matching process for each object in the first color image information;
   discriminating a type of each object included in the first color image information when the first color image information does not include the attribute information of a color matching process to be applied to each object in the first color image information;
   selecting one of a plurality of color matching methods suitable for the type of each object in accordance with previously prepared correspondence information between each type of object and each color matching method;
   adding attribute information of the selected color matching method to the corresponding object; and
   performing a color matching process on each object in the first color image information by using the color matching method selected in the selecting step so as to convert the first color image information into the second color image information.

2. The color conversion method as claimed in claim 1, wherein the discriminating step includes the step of determining whether or not each object in the first color image information corresponds to a bit map image, and the adding step includes the step of adding attribute information of a gradation maintaining type color matching method to each object corresponding to the bit map image.

3. The color conversion method as claimed in claim 1, wherein the discriminating step includes the step of determining whether or not each object in the first color image information corresponds to a bit map image, and the adding step is performed only for objects other than the object corresponding to the bit map image.

4. The color conversion method as claimed in claim 1, wherein the discriminating step includes the step of determining whether or not each object in the first color image information corresponds to a single color image, and the adding step includes the step of adding attribute information of a chroma maintaining type color matching method to each object corresponding to the single color image.

5. The color conversion method as claimed in claim 1, wherein the discriminating step includes the step of determining whether or not each object in the first color image information corresponds to a pattern image using a plurality of colors, and the adding step includes the step of adding attribute information of an intermediate method between a gradation maintaining type color matching method and a chroma maintaining type color matching method to each object corresponding to the pattern image using a plurality of colors.

6. A processor readable medium storing program code causing a computer to perform a color conversion method for converting first color image information into second color image information output to a color image outputting apparatus, comprising:
   program code means for inputting the first color image information including at least one object to be drawn;
   program code means for determining whether or not the first color image information includes attribute information of a color matching process for each object in the first color image information;

program code means for discriminating a type of each object included in the first color image information when the first color image information does not include the attribute information of a color matching process to be applied to each object in the first color image information;

program code means for selecting one of a plurality of color matching methods suitable for the type of each object in accordance with previously prepared correspondence information between each type of object and each color matching method;

program code means for adding attribute information of the selected color matching method to the corresponding object; and program code means for performing a color matching process on each object in the first color image information by using the color matching method selected in the selecting step so as to convert the first color image information into the second color image information.

7. The processor readable medium as claimed in claim 6, wherein the program code means for discriminating includes program code means for determining whether or not each object in the first color image information corresponds to a bit map image, and the program code means for adding includes program code means for adding attribute information of a gradation maintaining type color matching method to each object corresponding to the bit map image.

8. The processor readable medium as claimed in claim 6, wherein the program code means for discriminating includes program code means for determining whether or not each object in the first color image information corresponds to a bit map image, and the program code means for adding is performed only for objects other than the object corresponding to the bit map image.

9. The processor readable medium as claimed in claim 6, wherein the program code means for discriminating includes the step of determining whether or not each object in the first color image information corresponds to a single color image, and the program code means for adding includes program code means for adding attribute information of a chroma maintaining type color matching method to each object corresponding to the single color image.

10. The processor readable medium as claimed in claim 6, wherein the program code means for discriminating includes program code means for determining whether or not each object in the first color image information corresponds to a pattern image using a plurality of colors, and the program code means for adding includes program code means for adding attribute information of an intermediate method between a gradation maintaining type color matching method and a chroma maintaining type color matching method to each object corresponding to the pattern image using a plurality of colors.

* * * * *